(12) United States Patent
Ng et al.

(10) Patent No.: US 8,206,144 B2
(45) Date of Patent: Jun. 26, 2012

(54) TRANSFER DEVICE AND LINEAR-TYPE APPARATUS FOR THE MANUFACTURE OF CONTAINERS

(75) Inventors: Kheng Joo Ng, Octeville sur Mer (FR); Philippe Freire Diaz, Octeville sur Mer (FR)

(73) Assignee: Sidel Participations, Octeville-sur-Mer (FR)

(*) Notice: Subject to any disclaimer, the term of this patent is extended or adjusted under 35 U.S.C. 154(b) by 330 days.

(21) Appl. No.: 12/598,135

(22) PCT Filed: Apr. 22, 2008

(86) PCT No.: PCT/EP2008/054841
§ 371 (c)(1),
(2), (4) Date: Mar. 2, 2010

(87) PCT Pub. No.: WO2008/132090
PCT Pub. Date: Nov. 6, 2008

(65) Prior Publication Data
US 2010/0151069 A1 Jun. 17, 2010

(30) Foreign Application Priority Data
Apr. 30, 2007 (FR) ..................................... 07 54797

(51) Int. Cl.
*B29C 49/68* (2006.01)
*B29C 31/08* (2006.01)
*B65G 47/28* (2006.01)
(52) U.S. Cl. .................. 425/526; 198/803.4; 198/803.7; 294/116; 425/534
(58) Field of Classification Search .................. 425/526, 425/534; 198/470.1, 803.3, 803.4, 803.7; 294/99.1, 100, 116
See application file for complete search history.

(56) References Cited

U.S. PATENT DOCUMENTS

| 3,257,687 | A | * | 6/1966 | Fogelberg et al. ............ 425/534 |
| 4,355,968 | A | | 10/1982 | Lagoutte et al. |
| 5,681,521 | A | | 10/1997 | Emmer et al. |
| 5,893,700 | A | * | 4/1999 | Kronseder .................... 294/116 |
| 6,113,840 | A | | 9/2000 | Emmer et al. |
| 6,562,281 | B1 | | 5/2003 | Marchau et al. |
| 6,805,548 | B1 | | 10/2004 | Evrard |

FOREIGN PATENT DOCUMENTS
EP 1 375 395 1/2004
(Continued)

OTHER PUBLICATIONS

International Search Report dated Jul. 16, 2008, from corresponding PCT application.

*Primary Examiner* — Robert B Davis
(74) *Attorney, Agent, or Firm* — Young & Thompson

(57) ABSTRACT

A preform transfer device includes at least one clamp including two levers pivoting between an open position and a closed position and elements for the elastic return of the levers to the closed position. The device includes a mechanism for selectively controlling the opening and closing of the clamp, this mechanism including: a lever spreading member driven by a link including at least one free end able to interact with actuating elements to cause the clamp to open against the force of the elastic return elements, and associated locking elements that are able to move between a locked position in which the clamp is held in the open position and a retracted position in which the clamp is free to close, the locking elements being able to interact with second actuating elements designed to cause the locking element to move from the locked position to the retracted position, to trigger the closure of the clamp.

20 Claims, 17 Drawing Sheets

FOREIGN PATENT DOCUMENTS

| | | |
|---|---|---|
| FR | 2 479 077 | 10/1981 |
| FR | 2 774 666 | 8/1999 |
| FR | 2 879 179 | 6/2006 |
| WO | 94/23932 | 10/1994 |
| WO | 99/03667 | 1/1999 |
| WO | 00/69614 | 11/2000 |

* cited by examiner

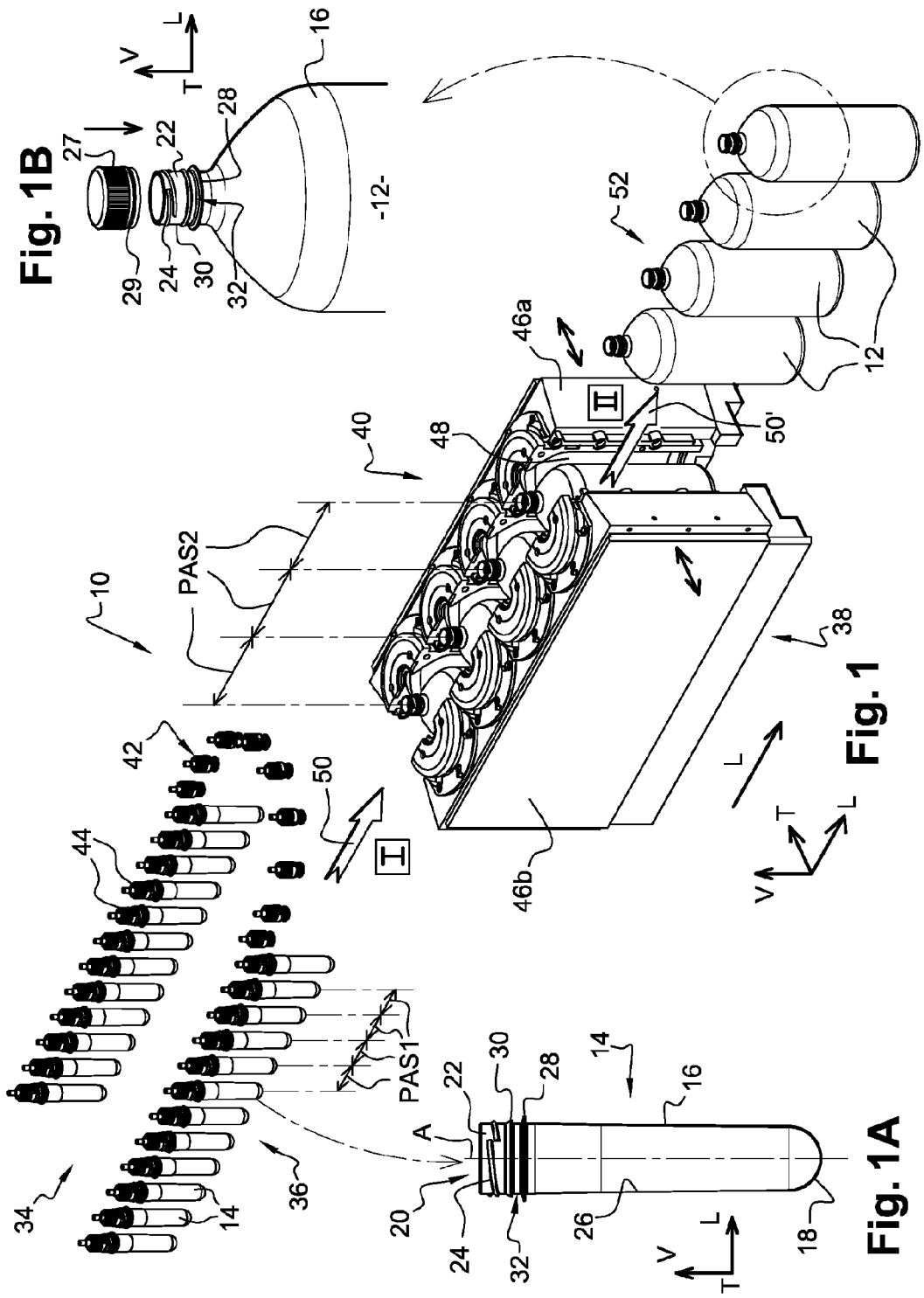

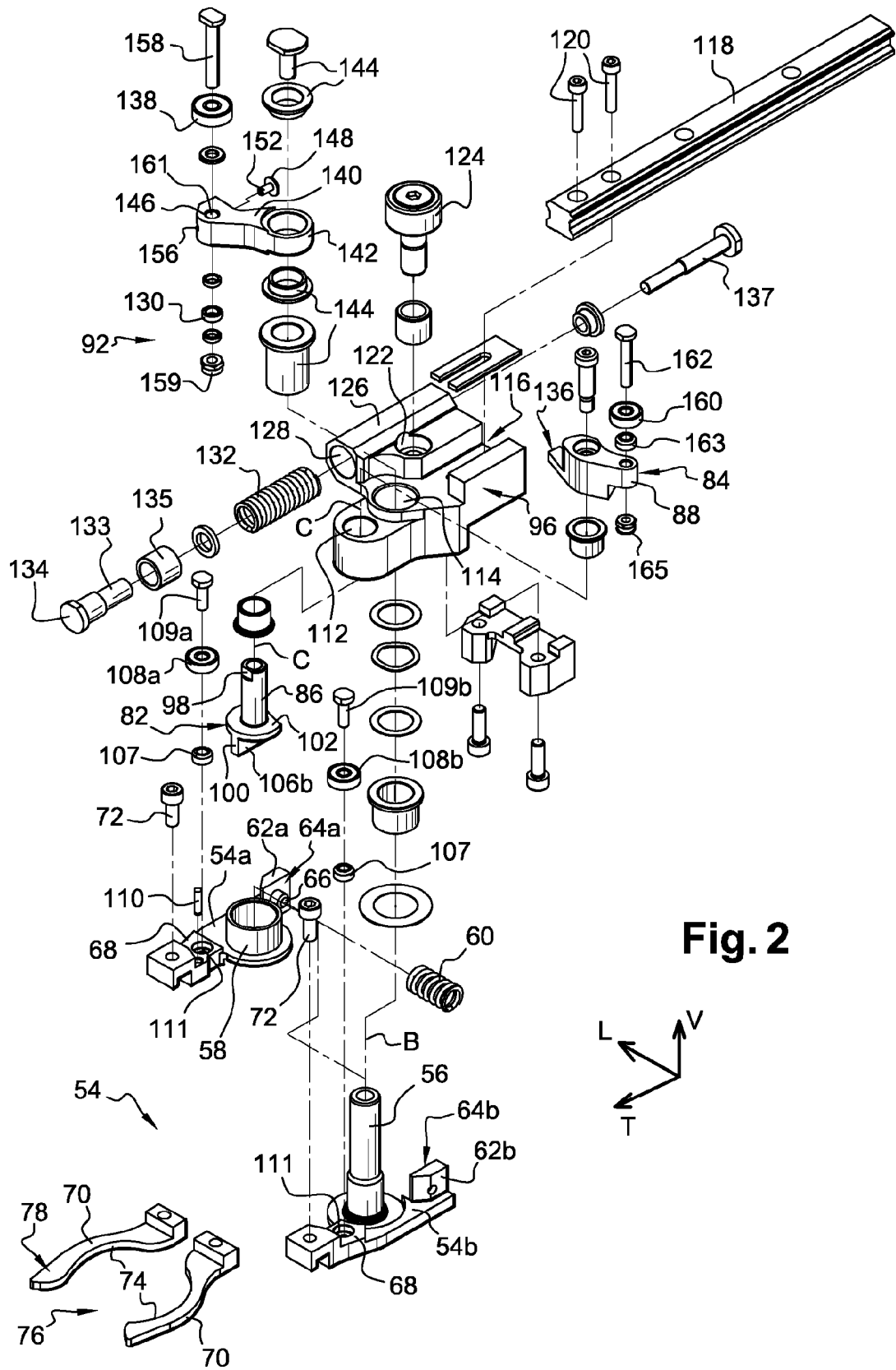

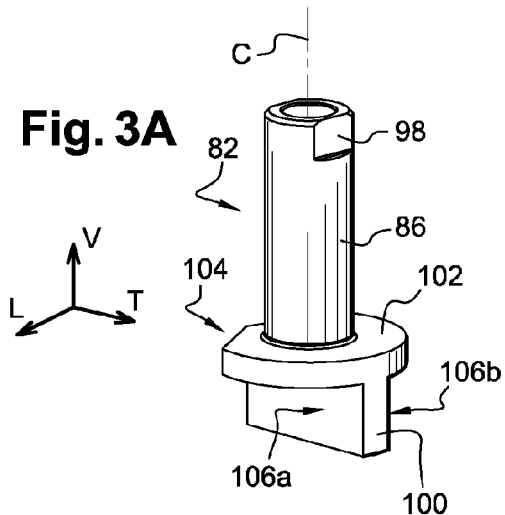
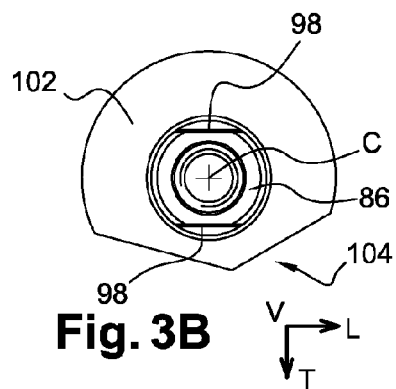
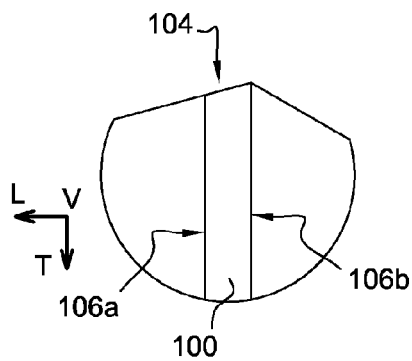
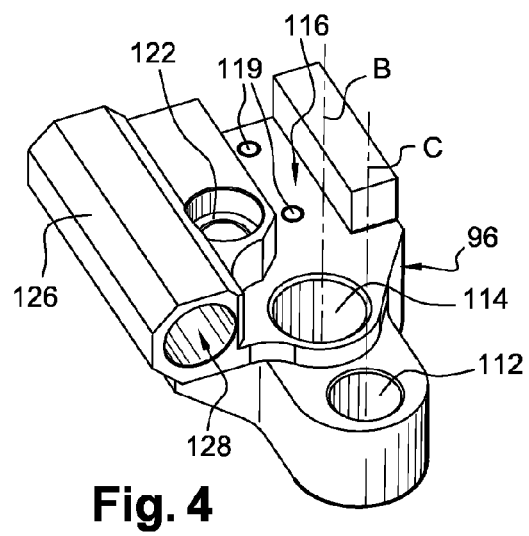
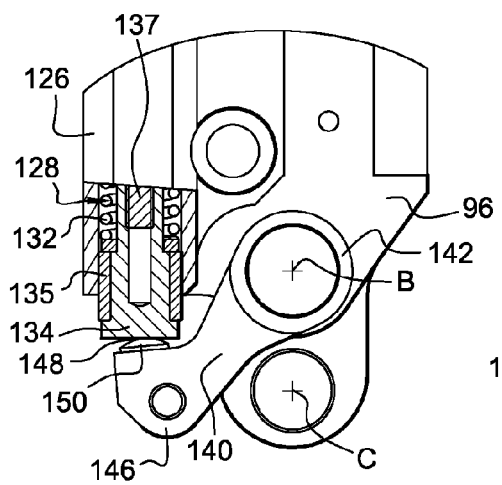
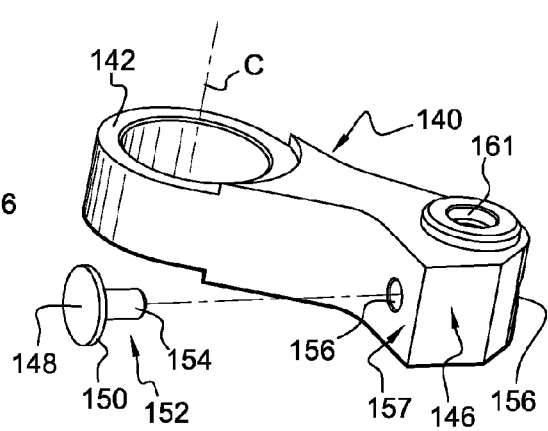

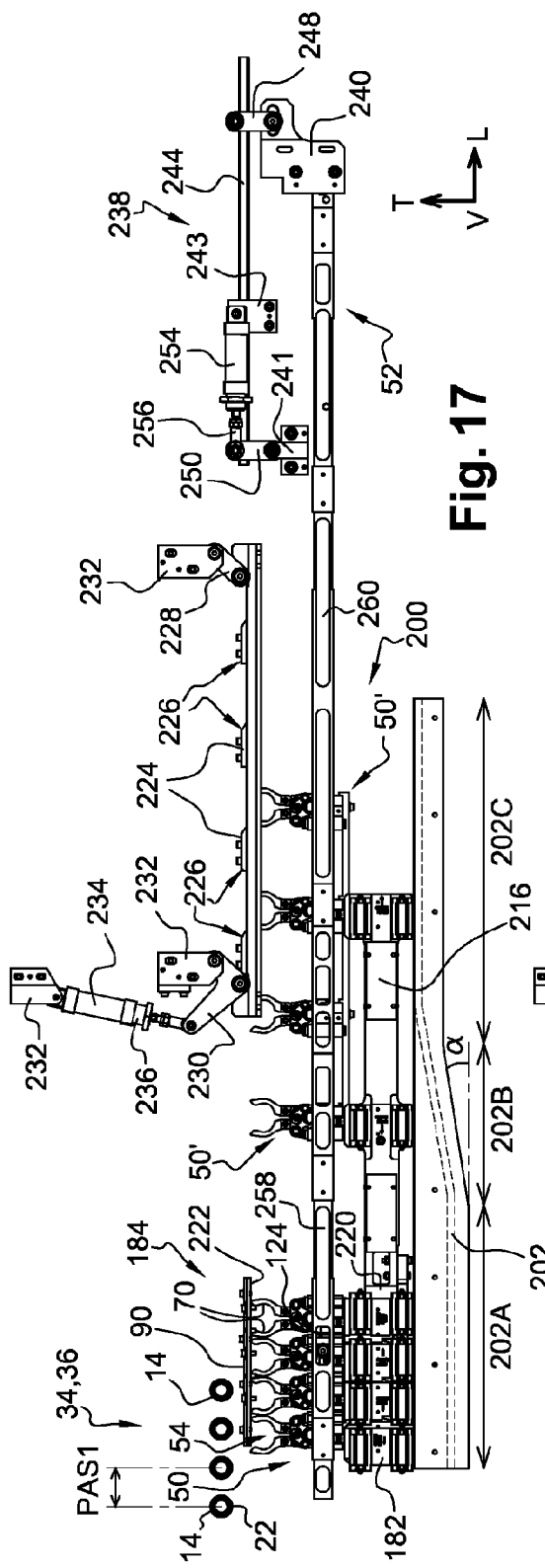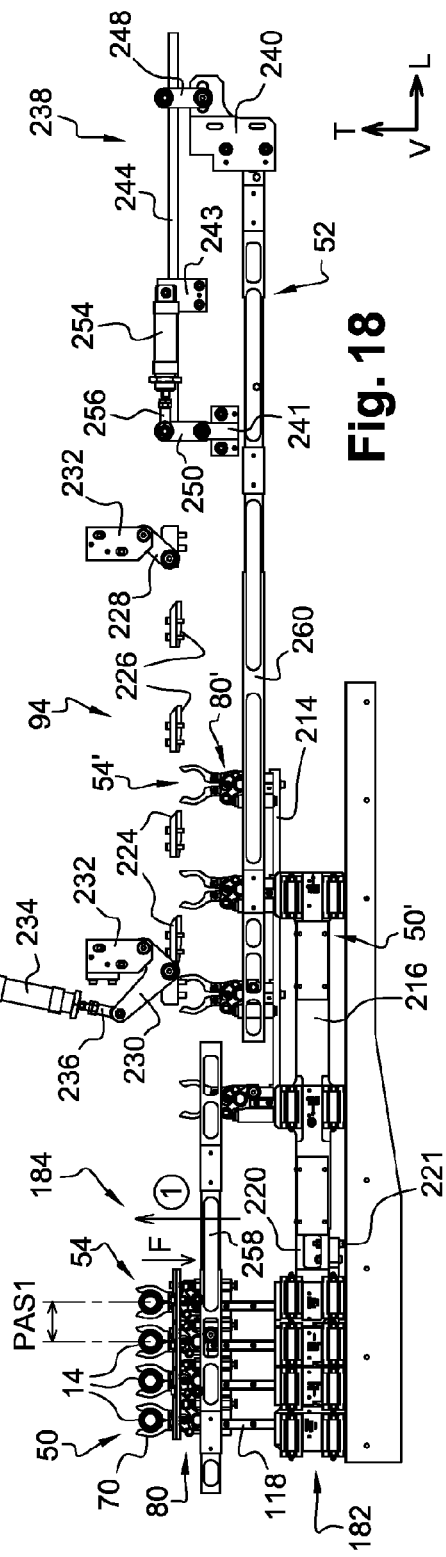

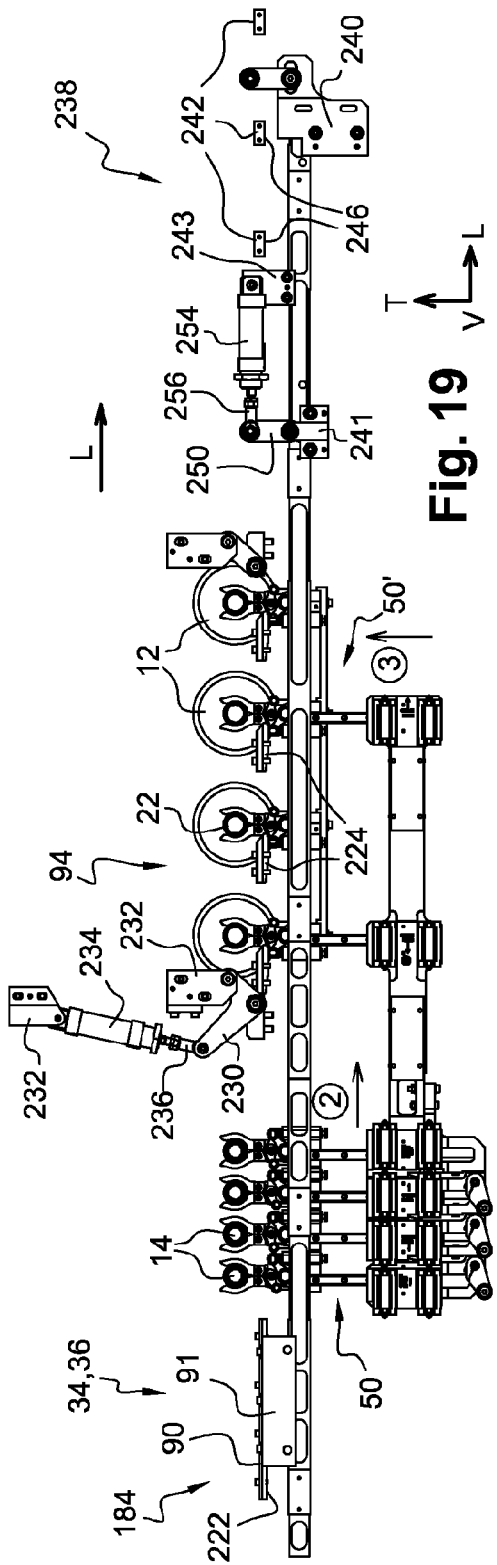
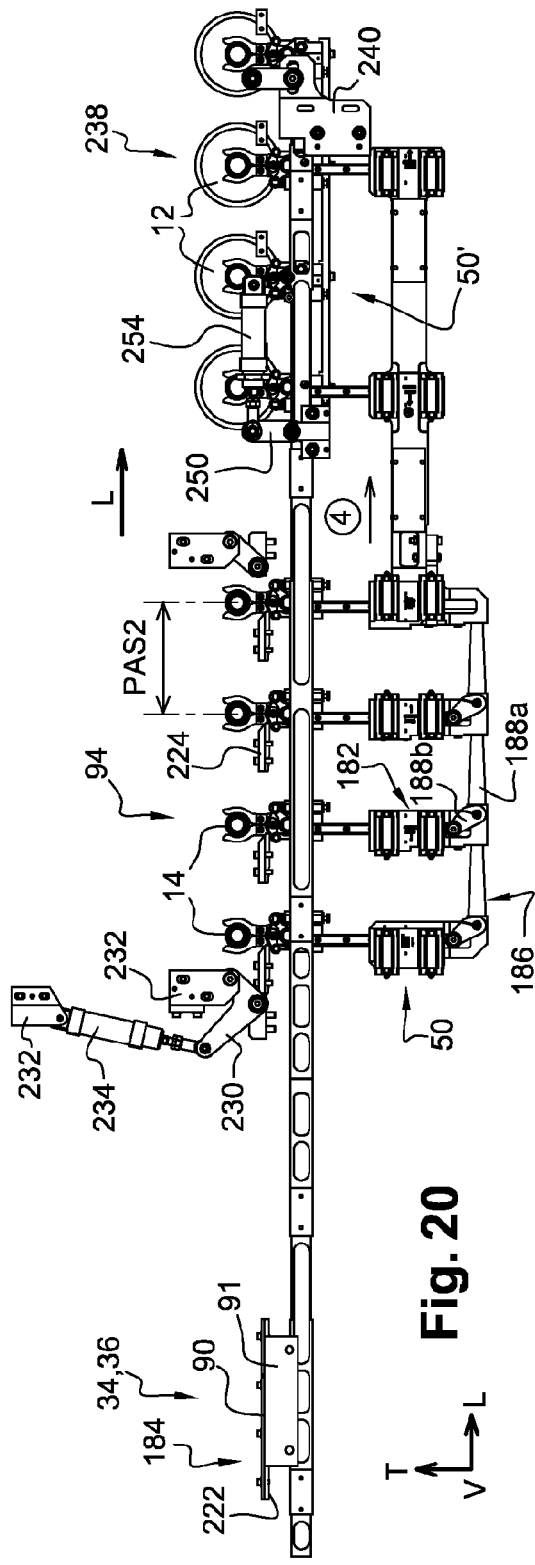

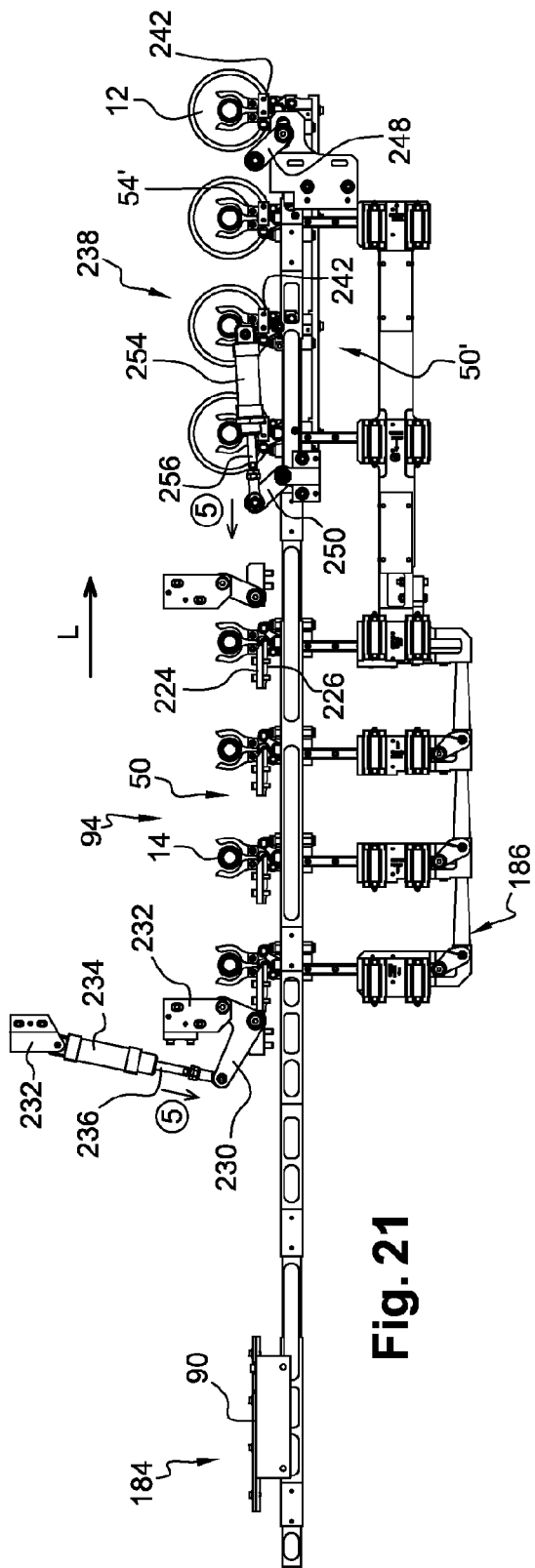
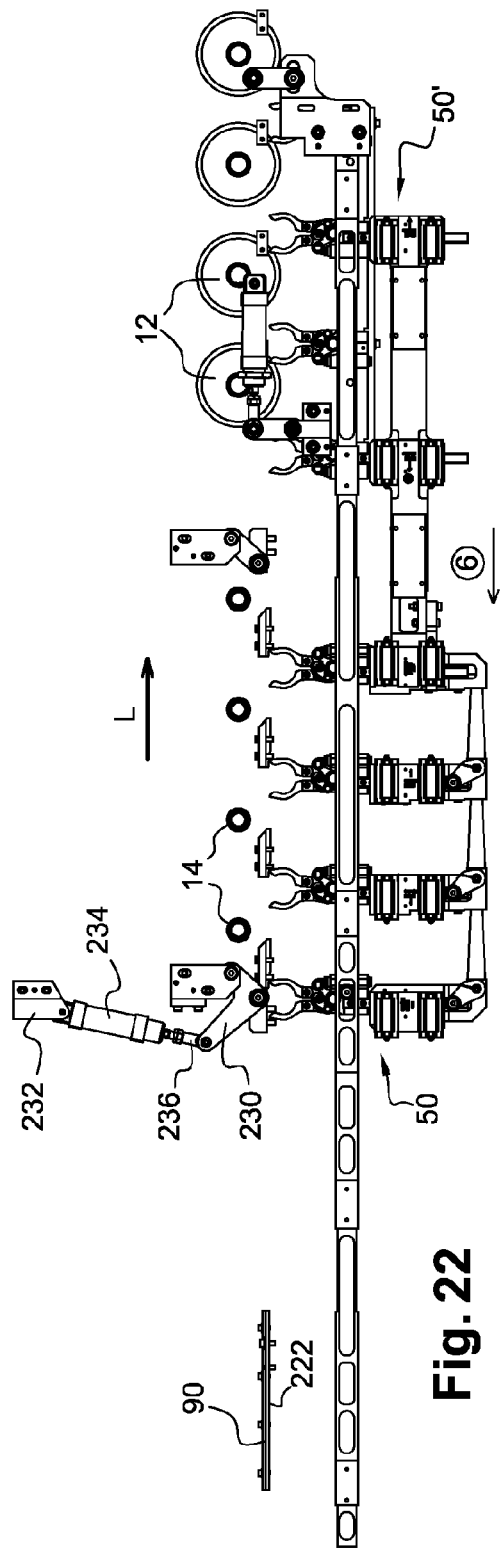
Fig. 21
Fig. 22

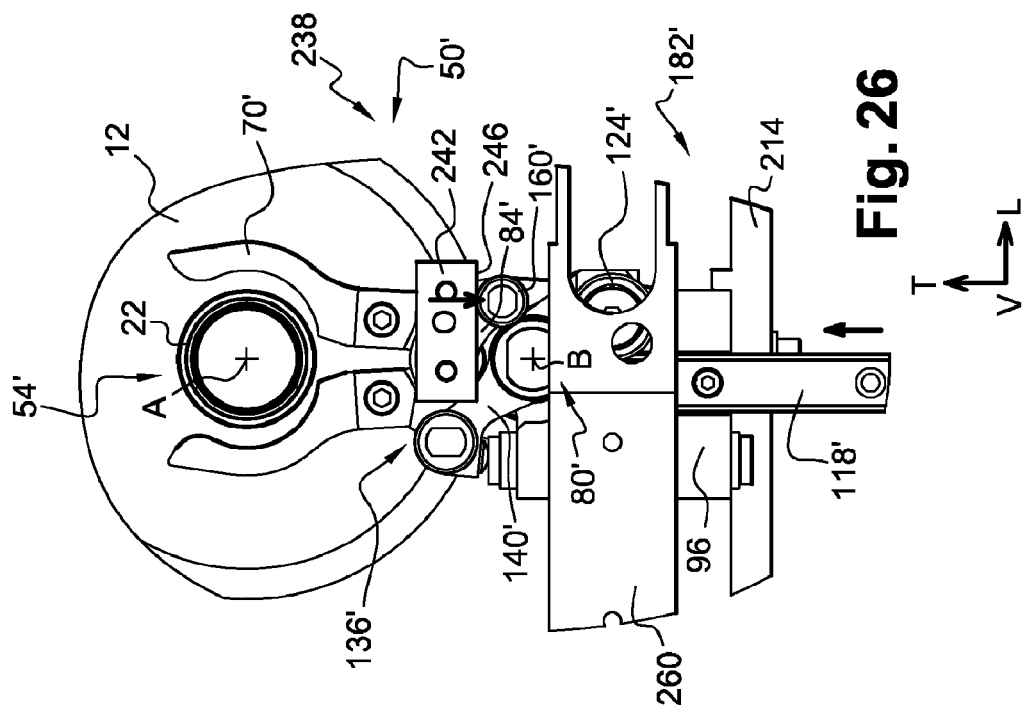
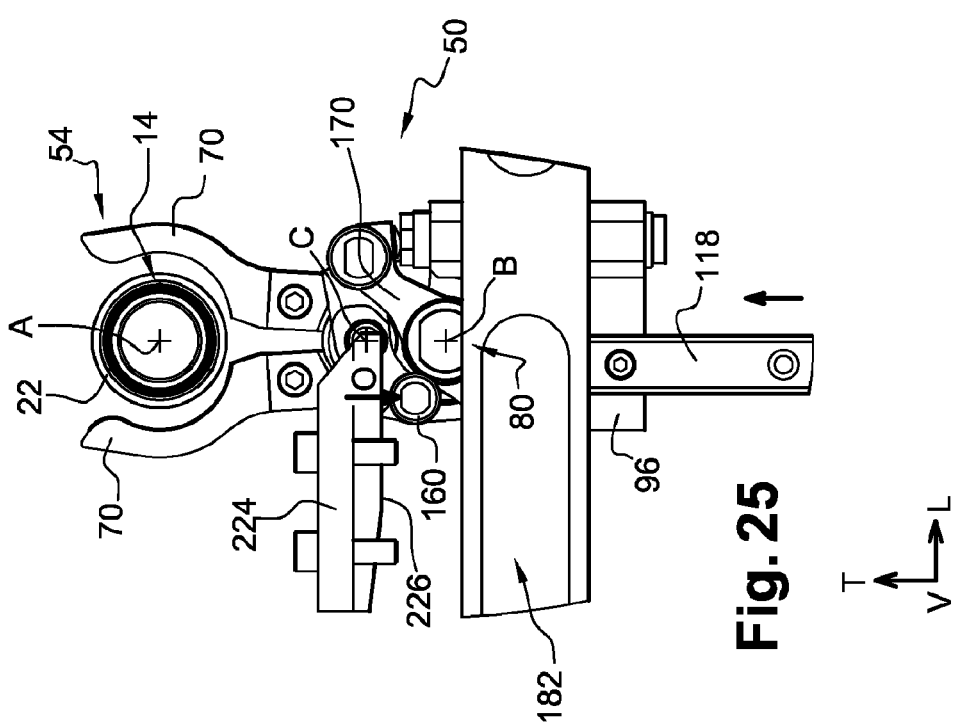

TRANSFER DEVICE AND LINEAR-TYPE APPARATUS FOR THE MANUFACTURE OF CONTAINERS

The invention relates to a transfer device, notably for transferring preforms or containers, and to an apparatus of the linear type for the manufacture of containers comprising such a device.

Numerous apparatus for the manufacture of containers, such as vials or bottles, particularly from preforms made of a plastic, for example of PET (polyethylene terephthalate) are known.

In such apparatus the preforms are generally, first of all, heated as they pass through a heat treatment or thermal conditioning unit comprising at least one oven intended to heat the preforms to a determined temperature close to their glass transition temperature and are then transferred directly to a molding unit, also known as a blow molding unit, where they can be shaped by blow molding or by stretch-blow molding.

Such apparatus comprise at least one transfer device for transporting the preforms and/or the containers between the various units, generally via their necks which are provided with a radial flange.

In container manufacturing apparatus, there is a main distinction drawn, on the basis of the design of the molding unit, between two broad families, namely, on the one hand, so-called "rotary" apparatus and, on the other hand, so-called "linear" apparatus at which the invention is more particularly intended.

It will be recalled that in the first, the molding unit of the apparatus is a rotary machine comprising a carousel which carries a number of molds distributed about its circumference, each mold, sometimes known as a "hinged" mold, comprising two half-molds mounted so that they can rotate one with respect to the other about an axis parallel to the axis of the container, and in which the containers are therefore successively individually molded.

By way of example, reference may be made, in the case of the first family of apparatus of the "rotary" type, to the Applicant Company's documents WO-A1-99/03667 (FIG. 5) or WO-A1-00/69614.

In the second family, the molding unit of the apparatus is said to be of the "linear" type because, by comparison, the machine comprises a mold which comprises two half-molds that can be moved translationally relative to one another at right angles to the parting line of the mold.

Production rates are generally higher in apparatus of the first family (in excess of 1500 containers/hour/mold) than in apparatus of the second family.

This is why apparatus of the "linear" type generally comprise a multi-cavity mold for molding several containers, at least two containers, simultaneously, thus making it possible to increase the production rates of apparatus of the second family.

By way of example, in the case of the second family of apparatus of the "linear" type, reference may be made to the Applicant Company's document FR-A1-2.879.179 regarding a transfer device intended to equip a linear-type container manufacturing apparatus.

A notable function of the transfer device is to transport therein a group of preforms (or parisons) from the exit from the oven of the thermal conditioning unit, where they are loaded into the molding unit from which they are unloaded, in order to be converted therein by blow molding or stretch-blow molding into as many containers, in this instance in groups of four containers.

That document more specifically describes connecting means capable of varying the separation between the modules that make up the transfer device, more specifically in order to vary the separation between the modules from a primary spacing P1 corresponding to the separation between two successive preforms as they leave the oven, to a secondary spacing P2, greater than the primary spacing P1, which corresponds to the separation needed for unloading between each preform-carrying module and which is determined by the separation in the mold between two successive container cavities.

Each module (or carriage) of the transfer device comprises gripping means formed of a gripper comprising two jaws that are articulated, about an axis B, between an open position and a closed position toward which the jaws of the gripper are elastically returned by an elastic member.

In order to load a preform, the gripper needs successively to open (open position) so that the jaws can be positioned around the neck of the preform, then to close again around the neck (closed position) above the flange of the preform.

The movement of the jaws of the gripper between the open and closed positions is not instigated selectively but is obtained directly by collaboration with the neck of the preform.

What actually happens is that the free end of each jaw of the gripper advantageously has a determined V-shaped profile made up of a front first surface and a rear second surface each forming a ramp intended to collaborate with the neck of the preform during the loading (gripping) and unloading (release) respectively.

In order to load a preform at the exit from the oven, the gripper is moved transversely forward toward the preform, this movement being synchronized with the speed of travel of the preforms which, having left the oven, are moving in the longitudinal direction of travel.

Each gripper will come into contact with that part of the neck of the preform that is situated above the flange and the jaws will therefore separate then immediately close again around the neck under the restoring force of the elastic member, the opening of the gripper being made easier by the collaboration of shapes between the front first surface of the V-shaped profile and the cylindrical neck of the preform.

The jaws of the gripper are therefore made to open by an engagement of the gripper on the neck of the preform with enough force to overcome the force exerted on the jaw by the elastic return member, that is to say by interlocking or "forced" insertion.

Likewise, when the gripper is moved transversely backward in order to unload, because each preform is immobilized by the mold, the jaws will separate to release the preform before closing again empty under the return force of the elastic member; during unloading, the opening of the gripper once again is made easier by the collaboration of shapes between the rear second surface of the V-shaped profile of the jaws and the cylindrical neck of the preform.

However, a transfer device such as this is not satisfactory in the case of a linear-type apparatus, particularly when the apparatus comprises a thermal conditioning unit comprising an oven intended to perform a heat treatment of the "preferential heating" type on the body of the preform.

A "preferential heating" heat treatment on the body of the preform entails selectively and differently heating certain portions of the body of the preform so that the temperature throughout the body of the preform is not homogeneous along the axis of the preform but has longitudinal portions that in relative terms are hotter alternating with other intermediate longitudinal portions that in relative terms are not so hot, the former being able to deform more readily than the latter during the subsequent deformation of the body of the preform during the blow molding or stretch-blow molding.

By virtue of such a heat treatment, it is possible to manufacture containers which have an approximately constant wall thickness throughout even though the body is of complex shape.

What is generally meant by a container of a complex shape is an end-container which is not approximately a cylinder of revolution but which, for example, has a polygonal (triangular, quadrilateral, pentagonal, etc.) horizontal section or alternatively a container with a flattened body, such as the vials intended to contain cleaning or sanitary products and the necks of which are provided with means of spraying or vaporizing the product, or even with a cap.

For further details regarding the heat treatment of the preform by preferential heating reference may advantageously be made for example to document WO-A-94/23932.

A transfer device of the type of that described in the aforementioned document FR-A1-2 879 179 is not satisfactory, particularly for transporting preforms that have been heat-treated using a "preferential heating" method.

The problem is that it has been found that the forced introduction of the jaws of the gripper around the neck of the preform may cause the preform to rotate about its vertical axis, thus altering the determined angular position of said more or less heated portions, leading to poor positioning (angular offsetting) of the preforms within the mold.

It will be appreciated that the angular offsetting of the more or less heated portions of the body of the preform with respect to a determined reference position inside the mold leads, after the operation of molding the preform, to the creation of a container that is noncompliant.

This is why the transfer device has to make it possible to transport the preforms from the oven as far as the mold keeping each preform in said determined reference position, when the apparatus is of the type comprising a thermal conditioning unit with a preferential-heating oven.

Leaving aside the matter of the use of a preferential heat treatment of the preforms in the apparatus, the use of a transfer device of the aforementioned (FR-A1-2.879.179) type may also, as the jaws of the gripper are pushed in order to grip or to release the containers, lead to more or less pronounced marking on the necks of the preforms or of the containers, something which is particularly detrimental to the end quality of the container.

In addition, in the special case of heat treatment of the preferential heating type, this problem of marking and of damage to the neck is even more keenly felt because this type of treatment is usually intended for the manufacture of containers of complex shape, such as vials, which generally have necks which are not as strong by comparison with the neck of a conventional bottle the shape of which is a cylinder of revolution.

Thus, depending on the thermoplastic used and on the desired type of finished container, forcible introduction of the jaws of the gripper around the neck sometimes causes material to be shaved off and form undesirable contamination liable to adversely affect particularly the manufacturing method or to damage the container such that it becomes irreparably unusable because it has been excessively weakened or is esthetically unacceptable.

It is an object of the present invention to solve the aforementioned disadvantages, particularly controlling the angular position of the preform while it is being transferred and damage to the neck of the preform or of the container.

To this end, the invention proposes a transfer device for transferring a preform or a container, comprising at least one gripper which consists of two horizontal levers mounted articulated about a vertical axis between a position in which the gripper is open and a position in which it is closed, and which comprises elastic return means which return the levers toward the closed position, characterized in that the transfer device comprises a mechanism for selectively instigating the opening and closing of the gripper, this mechanism comprising:
  a separating member for separating the levers which is intended to be driven by a driving link which is pivot-mounted about a shaft, the driving link that drives the separating member comprising at least one free end which is able to collaborate with first actuating means intended to cause the gripper to open against the action of first elastic return means that return the levers, and
  associated locking means which are mounted able to move between a locked position in which the gripper is kept in the open position and a retracted position in which the gripper is free to close, the locking means being able to collaborate with second actuating means intended to cause the locking means to move from the locked position into the retracted position so as automatically to trigger the closing of the gripper.

According to other features of the transfer device according to the invention:
  the separating member rotates as one with the driving link so that the assembly formed by the separating member and the driving link is able to pivot about the vertical shaft between:
    an active position corresponding to the locked position of the locking means, in which position the separating member is kept in order to urge the levers, against the action of the first elastic return means, into the position in which the gripper is open, and
    a passive position corresponding to the retracted position of the locking means and in which the released separating member, which is urged by the first elastic return means, collaborates with stop means which determine the closed position of the gripper;
  the locking means comprise a locking pawl which is mounted to move between the retracted position and the locked position in which the locking pawl, which is urged by second elastic return means, collaborates with a complementary notch to immobilize the assembly formed by the separating member and the driving link against the action of the first elastic return means;
  the locking means comprise an instigating element instigating closure of the gripper which, being able selectively to collaborate with the first actuating means, is able to bring about unlocking by moving the locking pawl against the action of the second elastic return means, from the locked position into the retracted position so that, by releasing the assembly formed by the separating member and the driving link, the first elastic return means that elastically return the levers cause the gripper to close automatically;
  the closure instigating element and the locking pawl are mounted secured to the free end of a support arm which is pivot-mounted at its other end about a vertical axis, the support arm being urged by the second elastic return means of the locking means;
  the driving link of the separating member comprises at its free end an instigating element that instigates the opening of the gripper and which, being able selectively to collaborate with the second actuating means, is able to cause the separating member to move from the passive position toward the active position corresponding to the open position of the gripper;

the mechanism comprises a lever comprising an end which is connected to the driving link and the free other end of which comprises the notch that complements the locking pawl;

the lever comprises a guiding surface adjacent to the notch and against which the locking pawl bears in the retracted position, in that the locking pawl travels over the ramp-forming guiding surface when the lever is driven by the driving link that the first actuating means collaborating with the instigating element that instigates opening of the gripper moves toward the active position, and in that, when the driving link reaches the active position corresponding to the open position of the gripper, the locking pawl simultaneously pivots into the locked position entering the notch.

The invention further relates to a linear apparatus for the manufacture of containers from thermoplastic preforms, comprising, in succession, from upstream to downstream in a longitudinal direction of travel, at least:

a thermal conditioning unit comprising heating means, such as a preferential-heating oven, intended to heat the preforms to a determined temperature, a molding unit comprising at least one mold for converting at least one preform into a container by blow molding or by stretch-blow molding, and at least one transfer device as claimed in any one of the preceding claims, which is intended to transfer a preform, or a group of preforms, from the thermal conditioning unit to the molding unit.

According to other features of the apparatus:

the apparatus comprises a first transfer device comprising at least one module, or a group of modules, able to transfer simultaneously at least one preform, or a group of preforms, from a loading zone situated at the exit from the thermal conditioning unit as far as the molding unit;

at least the modules of the first preform transfer device are connected to one another via connecting means able to vary the longitudinal separation that separates two successive grippers, between a first separation, known as PAS1, corresponding to a contracted configuration of the modules and a second separation, known as PAS2, corresponding to a deployed configuration of the modules;

each module of the first preform transfer device comprises a gripper the opening and closing of which is instigated selectively by means of the mechanism so as notably to transfer the preform keeping it in a determined angular position from its loading to its unloading from a mold of the molding unit;

the first actuating means are arranged at the loading zone at the exit from the thermal conditioning unit so as to collaborate with the instigating element that instigates the closing of each gripper in order selectively to instigate the closing of each gripper around the neck of each preform that is to be transferred;

the second actuating means are arranged at the molding unit so as to collaborate with the instigating element that instigates the opening of each gripper in order selectively to instigate the opening of each gripper when the preforms are immobilized in the angular position that has been determined at least by the mold;

the apparatus comprises, downstream of the first, a second transfer device comprising a similar mechanism which is able to transfer in the downstream direction a container, or a group of containers, manufactured by the molding unit via at least one module, or a group of modules;

the second actuating means arranged at the molding unit are able to collaborate with the instigating element that instigates the closing of each gripper of the second transfer device so as selectively to instigate the closing of each gripper around the neck of the manufactured container intended to be transferred in the downstream direction;

the second actuating means are mounted such that they can move between a first actuating position and a second actuating position so as selectively to collaborate with the instigating element that instigates the closing of each gripper of the second, container, transfer device in the first position, and with the instigating element that instigates the opening of each gripper of the first, preform, transfer device in the second position;

the apparatus comprises at least first transmission means able to move the first, preform, transfer device and/or the second, container, transfer device in the longitudinal direction, and second transmission means able to move the grippers of the modules of the first, preform, transfer device and/or the second, container, transfer device, respectively in a transverse direction, orthogonal to the longitudinal direction of travel so that the preforms or the containers can be loaded or unloaded;

the apparatus comprises third actuating means which, arranged downstream of the molding unit, are able to collaborate with the instigating element that instigates the opening of each gripper in order selectively to instigate the opening of each gripper of the second transfer device so as to release the containers.

Other features and advantages of the invention will become apparent from reading the detailed description which follows, for an understanding of which reference will be made to the attached drawings in which:

FIG. 1 is a perspective view schematically depicting a linear apparatus for the manufacture of containers;

FIGS. 1A and 1B are detailed views respectively depicting an exemplary embodiment of a preform and the upper part of a bottle, obtained from such a preform, with a closure equipped with a safety band;

FIG. 2 is an exploded perspective view of the various components of one of the grippers of the preform transfer device and of its associated mechanism for selectively instigating the opening and closing according to the invention;

Figure 7A:
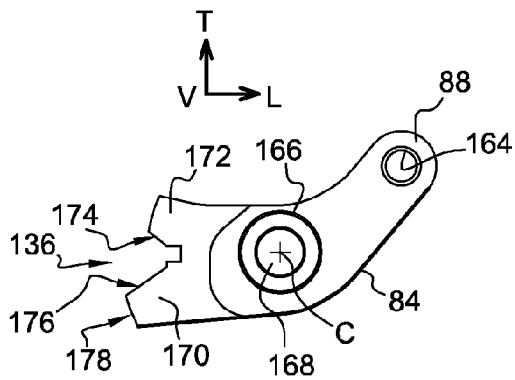
Figure 7B:
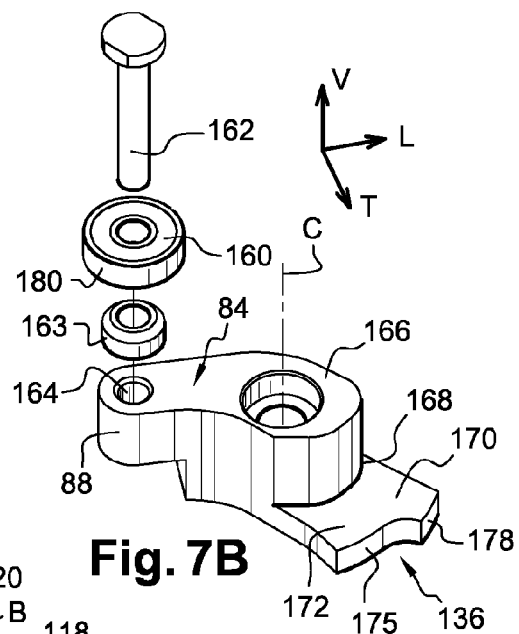
Figure 8:
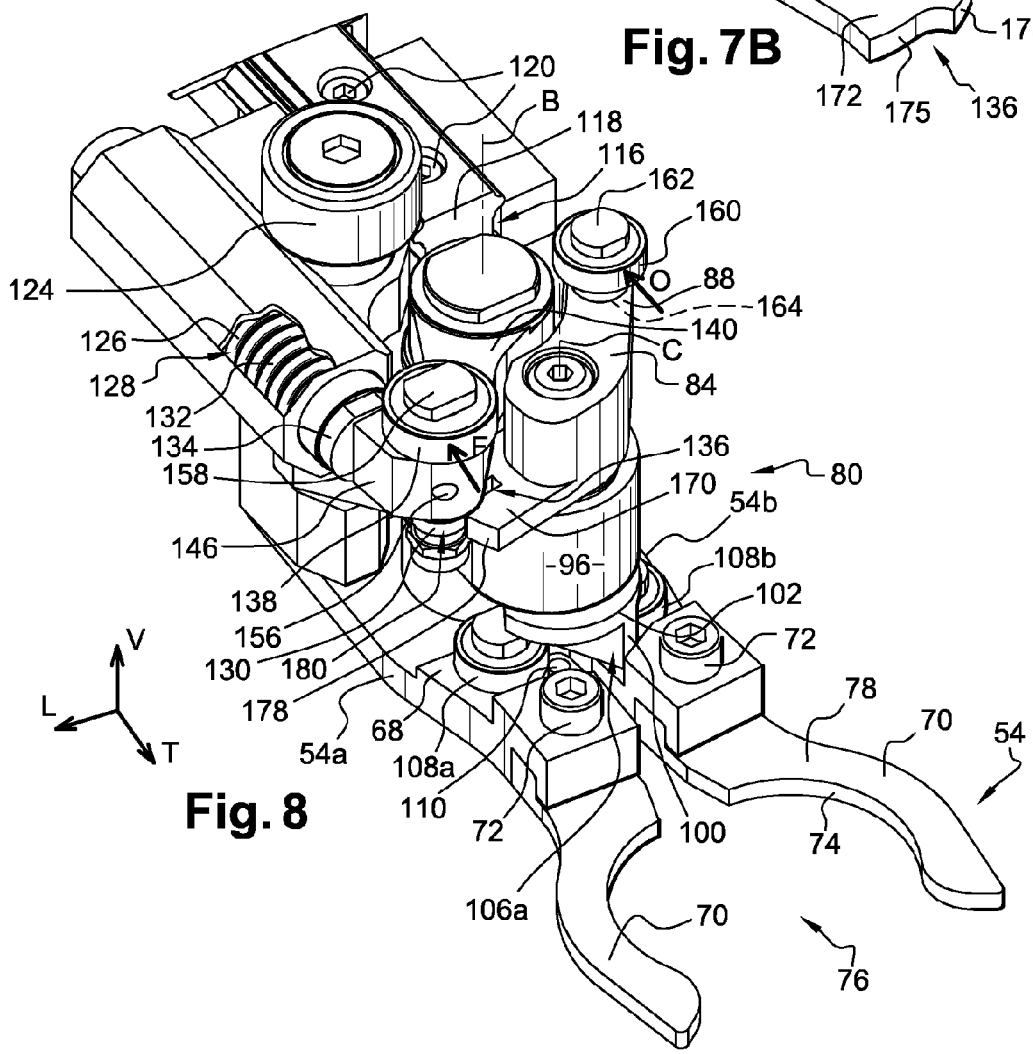
Figure 9:
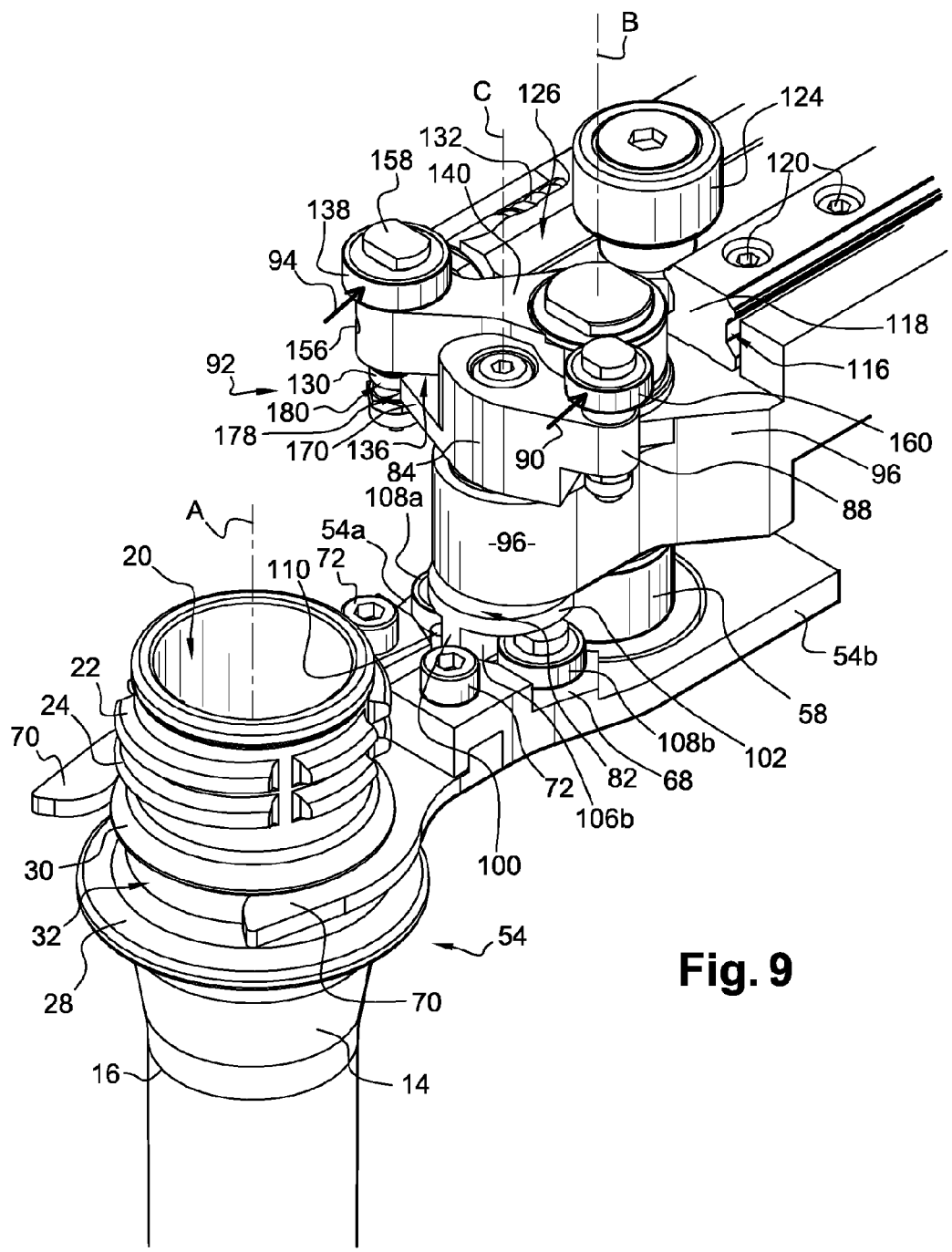
Figure 10:
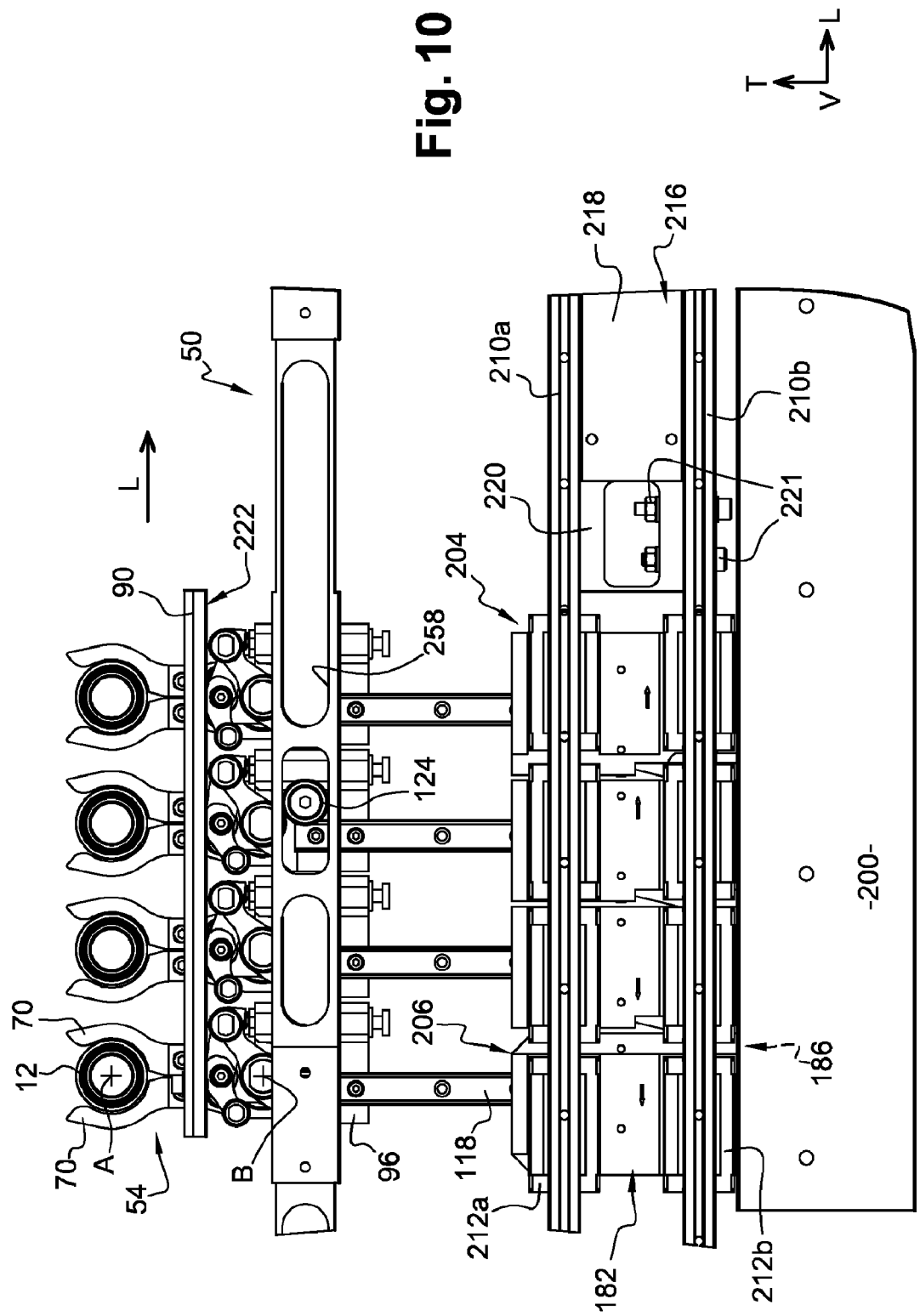
Figure 11:
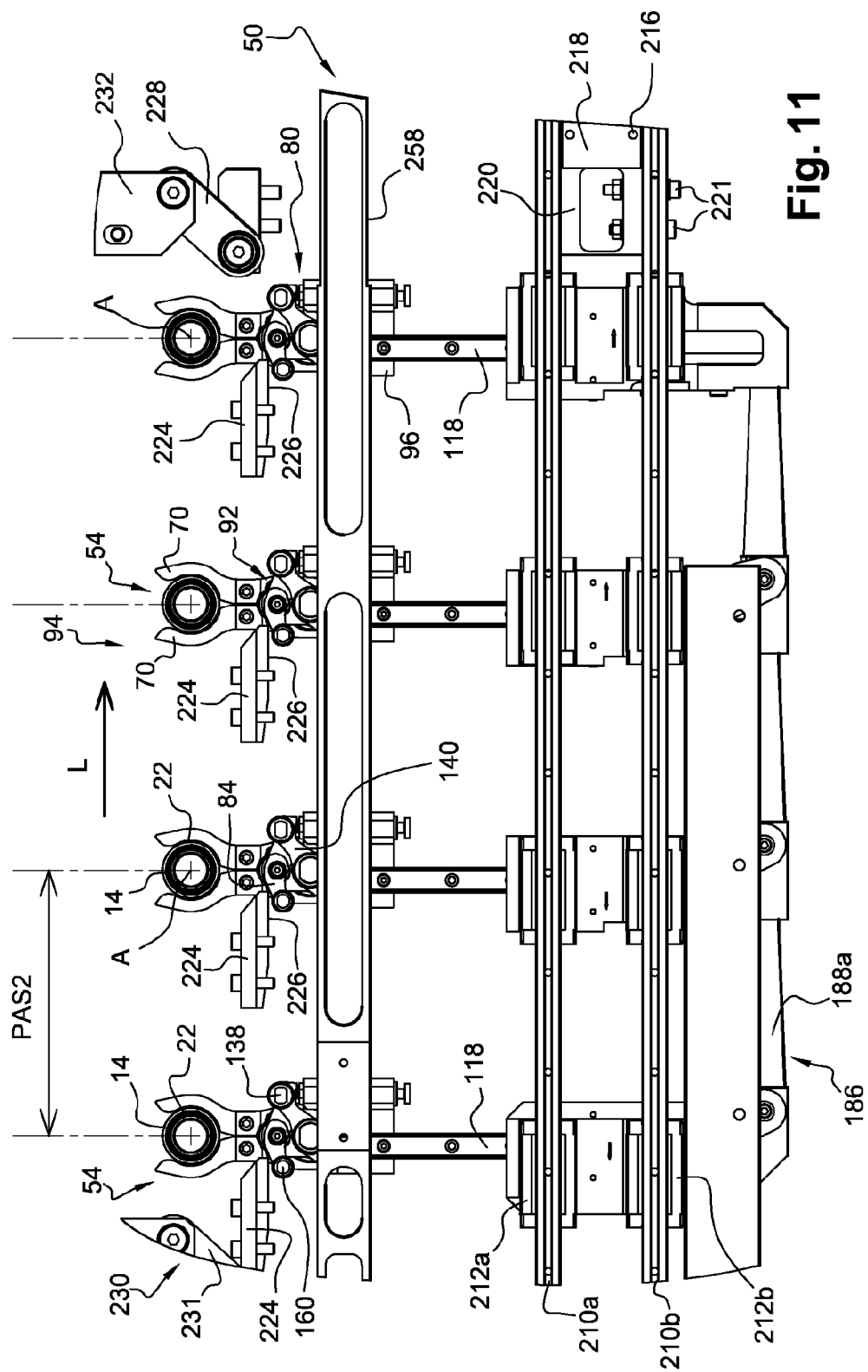
Figure 12:
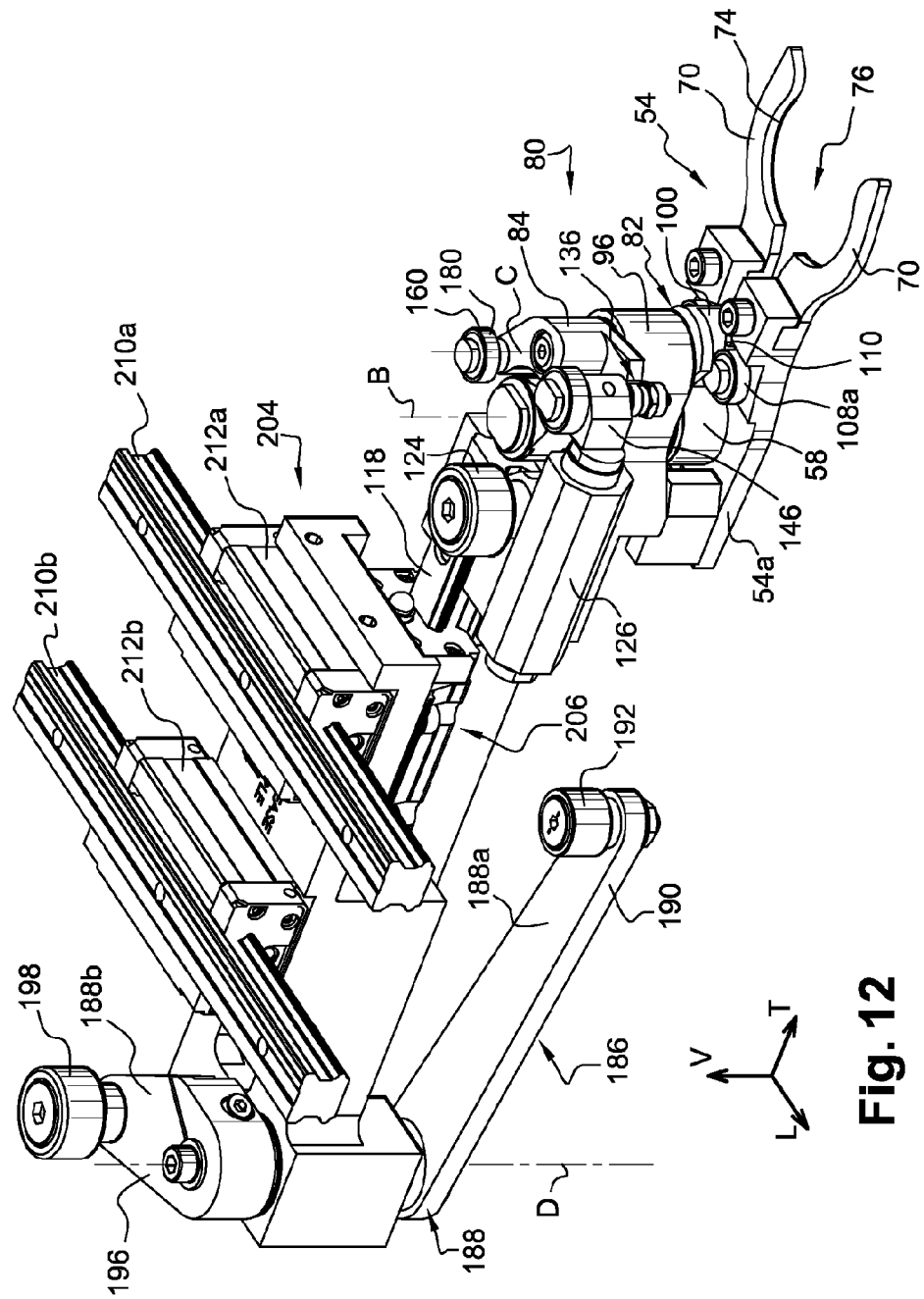
Figure 13:
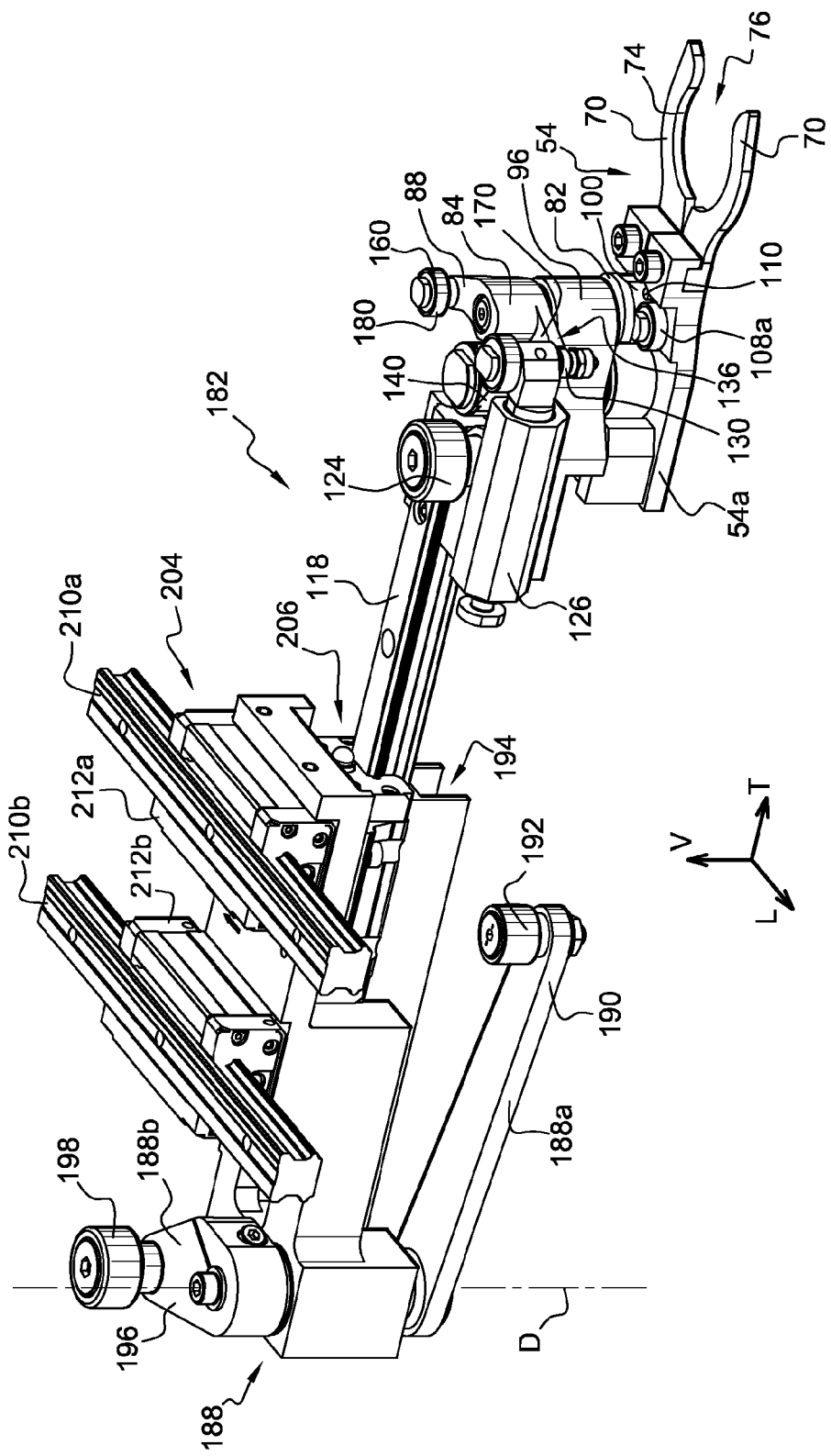
Figure 14:
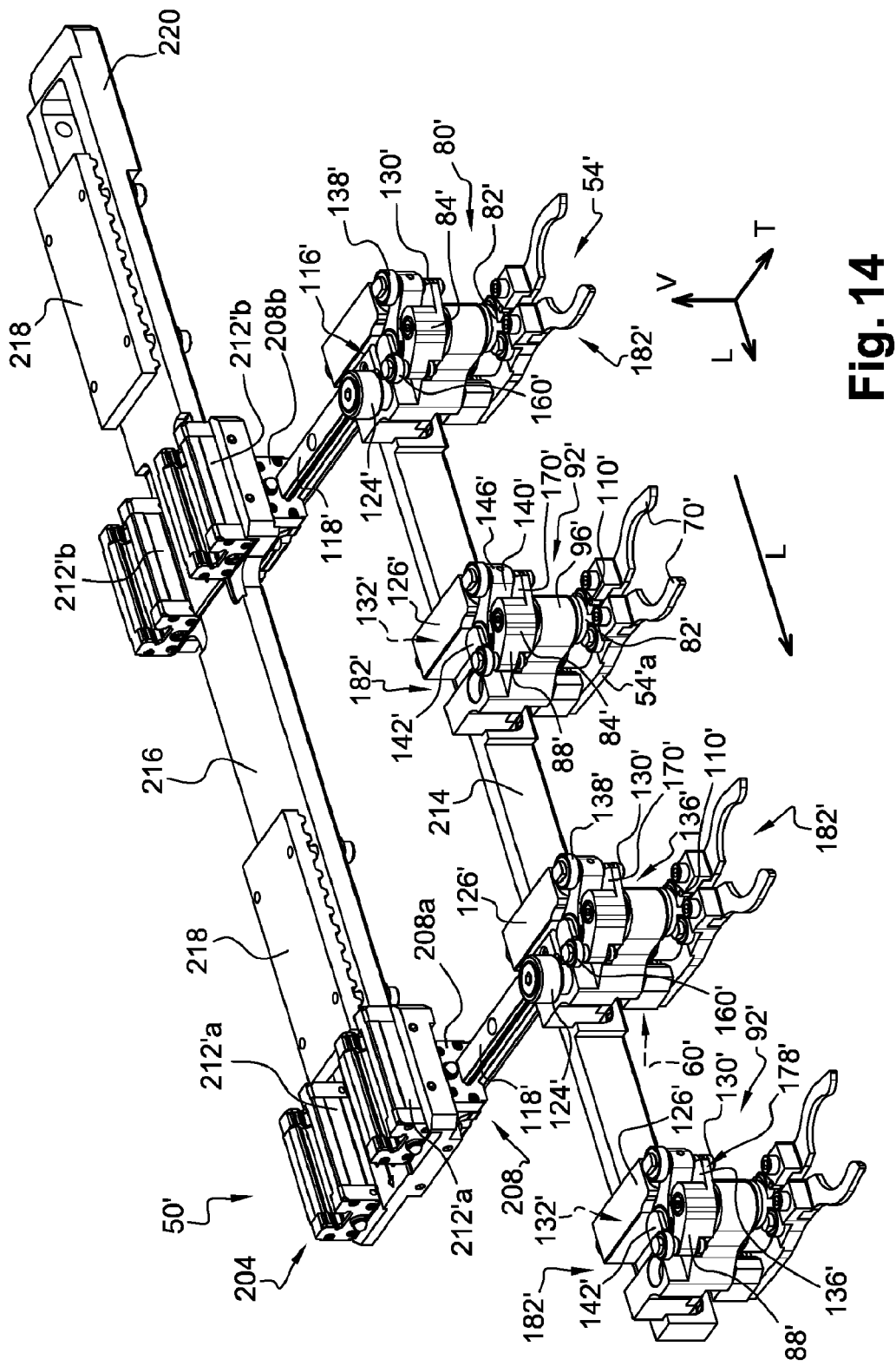
Figure 15:
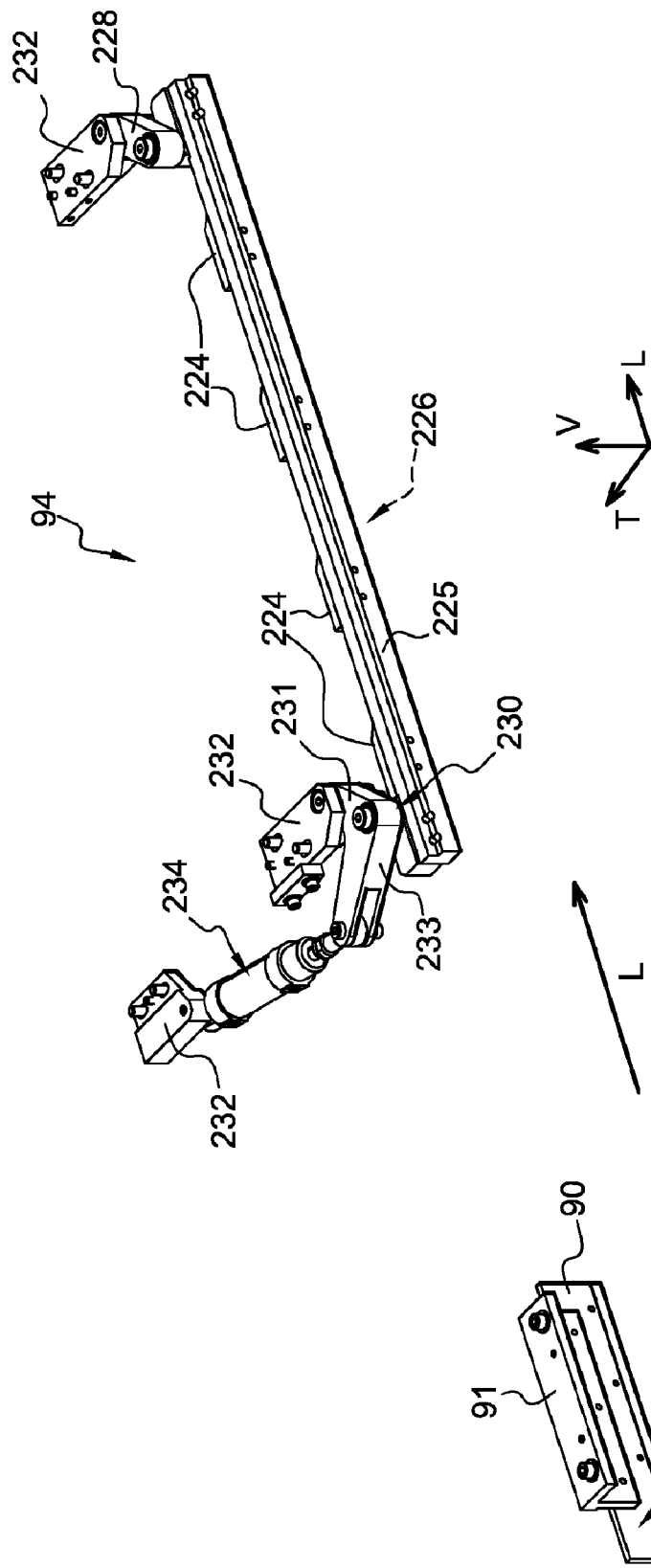
Figure 16:
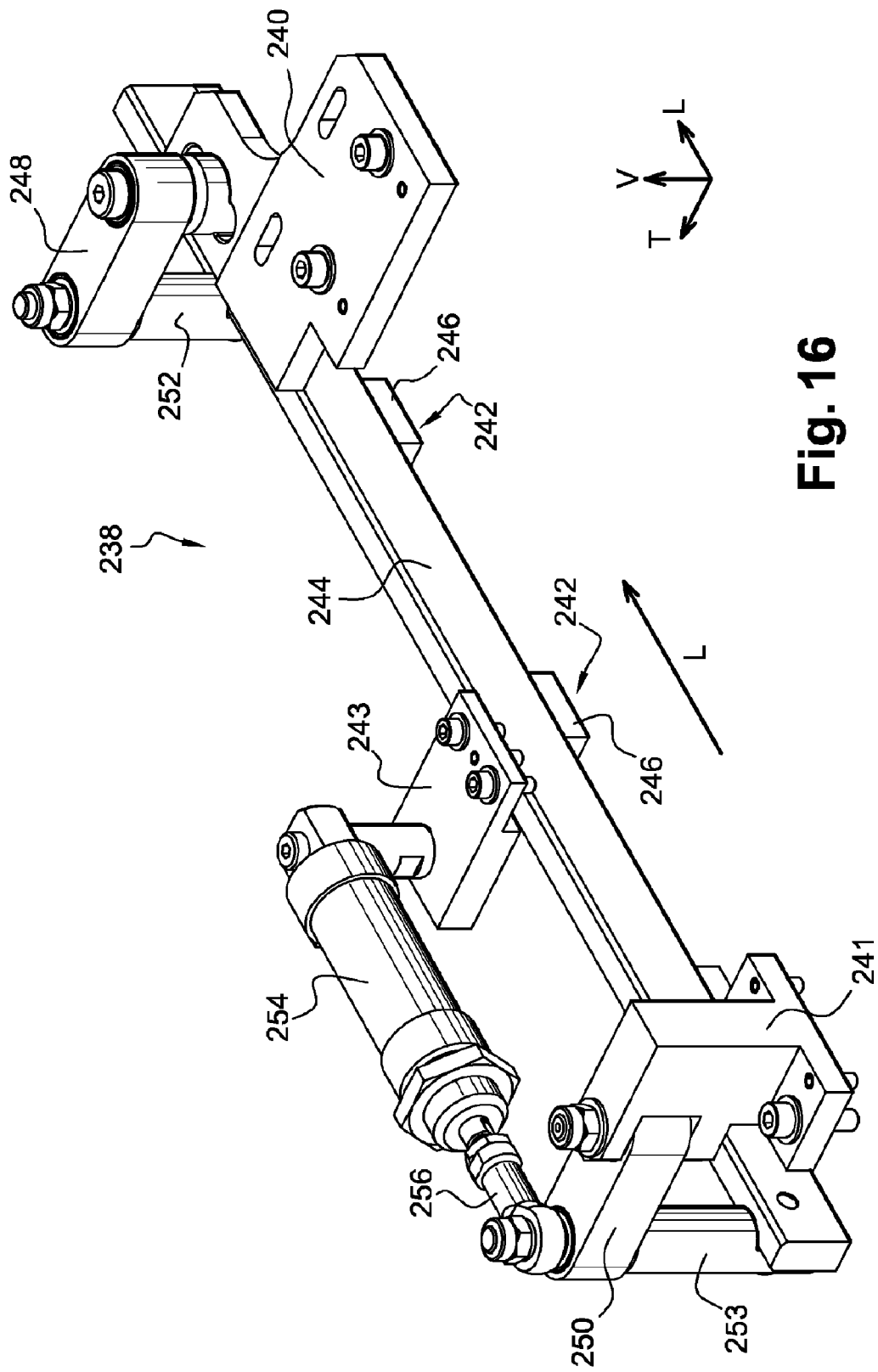

FIGS. 3A to 3C respectively are views in perspective, from above, and from below, of the lever separating member;

FIG. 4 is a perspective view of the plate;

FIG. 5 is a view from above of the plate with a partial horizontal section through the casing illustrating the elastic return means which urge the arm carrying the locking pawl toward the locked position;

FIG. 6 is a perspective view from the rear depicting the support arm and the pin;

FIGS. 7A and 7B respectively are a view from above of the driving link and a perspective view of an alternative form of embodiment of the notch of the driving link;

FIGS. 8 and 9 are perspective views, these respectively being a three quarters left and a three quarters right perspective view, depicting a gripper according to FIG. 2 and illustrating the position of the various components of the mechanism in the gripper open position and the gripper closed position;

FIGS. 10 and 11 are views from above depicting a preform transfer device comprising four modules equipped with a gripper and which respectively illustrate the contracted configuration of the modules corresponding to a first separation PAS1 and the deployed configuration of the modules at a second separation PAS2;

FIGS. 12 and 13 are three quarters left perspective views depicting one of the modules of the preform transfer device according to FIGS. 10 and 11 and the associated movement transmitting means for moving the module in the longitudinal and transverse directions and which respectively illustrate an extreme rear position in which the device is notably able to be moved longitudinally and an extreme forward position in which the gripper is deployed in order to proceed with the operations of loading or of unloading the preforms;

FIG. 14 is a perspective view depicting the second transfer device with which the apparatus is equipped and which, intended for the transfer of manufactured containers, illustrates a second transfer device comprising, like the first, four grippers each equipped with an associated mechanism for selectively instigating the opening and closing thereof;

FIG. 15 is a perspective view depicting the first actuating means able to collaborate with the elements that instigate the closing of the grippers of the preform transfer device and the second actuating means able selectively to collaborate with the elements that instigate the opening of the grippers of the preform transfer device and the elements that instigate the closing of the grippers of the container transfer device;

FIG. 16 is a perspective view depicting the third actuating means able to collaborate with the elements that instigate the opening of the grippers of the container transfer device;

FIGS. 17 to 22 are views from above of a linear apparatus which has been depicted schematically and which illustrate the various steps in a transfer cycle during which the first transfer device transports a group of four preforms from the exit from the oven to the mold, and during which, at the same time, the second transfer device transports the four containers, manufactured from the preceding preforms transferred by the first device, from the mold as far as the unit situated downstream in the longitudinal direction of travel;

FIGS. 23 to 26 are views from above depicting in detail the collaboration between the various actuating means and the elements that instigate opening and/or closing of the grippers of each transfer device according to the transfer cycle depicted in FIGS. 17 to 22.

In the description and the claims use will be made non-limitingly of the terms "upstream" and "downstream", "front" or "forward" and "rear", "upper" and "lower", "left" and "right", etc., and the orientations "longitudinal", "vertical" and "transverse" to denote respectively elements according to the definitions given in the description and with respect to the trihedral reference frame (L, V, T) depicted in the figures.

In the remainder of the present description, identical, similar or analogous elements of the invention will be denoted by the same reference numerals, and furthermore, the vertical orientation is determined simply by convention and should not be interpreted limitingly as corresponding to the Earth's gravitational field.

FIG. 1 schematically depicts an apparatus 10 of the linear type for the manufacture of containers 12 from preforms 14.

In the known way, the preforms 14 are made of a thermoplastic, particularly of PET (polyethylene terephthalate) and are intended to be heated and then molded by blow molding or by stretch-blow molding in order ultimately to obtain containers 12, such as vials or bottles.

The preforms 14 are generally manufactured using an injection molding process, which molding step may be incorporated into the apparatus or performed at a location other than the site of the apparatus 10.

As can be seen in detail in FIG. 1a, the preform 14 has the overall shape of a tube which in this instance extends vertically along a vertical main axis A.

The preform 14 comprises a body 16, here cylindrical overall, which is closed at its lower end by a bottom 18 and which, at the opposite end, is open at its top end in the form of an opening 20 delimited by the mouth of a neck 22.

From the bottom 18 to the neck 22, the cylindrical internal wall 26 of the body 16 of the preform 14 delimits an interior volume which, when the preform has been blow molded, corresponds to the interior volume of the end container 12, which is intended subsequently to be filled via the opening 20.

Advantageously, the neck 22 of the preform 14 already has the definitive shape of the neck of the end container 12, for example the neck 22 of a bottle, as illustrated in detail in FIG. 1B.

For preference, the neck 22 is provided with means 24, here depicted in the form of a helical thread, able to collaborate with complementary means belonging to a closure 27 intended to close the container 12.

The neck 22 comprises at least one external flange 28 which extends radially outward, over the entire circumference of the lower part of the neck 22.

Advantageously, the neck 22 comprises a bead 30 which, arranged vertically above the flange 28, delimits with said flange 28 an annular groove 32 intended later to accommodate a tamperproofing band 29 connected to the closure 27 by frangible ties.

In a known way, such a tamperproofing band has the function of allowing the consumer or user of the container to be certain, simply by visually examining it, that the product has not yet been opened, the ties connecting the band to the closure being intended to break definitively when the container 12 is first opened.

FIG. 1 schematically illustrates the main steps in the manufacture of a container 12 from a preform 14 in a linear-type apparatus 10.

In the apparatus 10, the preforms 14 then the containers 12 move, form the upstream direction downstream, in a main direction L of travel directed longitudinally so that they travel in succession through the various units or stations of the apparatus 10 in a substantially rectilinear path.

The container manufacturing apparatus 10 comprises, in succession at least one thermal conditioning unit 34 comprising heating means intended to heat the preforms 14 to a determined temperature and, downstream, a molding unit 38 comprising at least one mold 40 for converting at least one preform 14 into a container 12 by blow molding or by stretch-blow molding.

The heating means comprise, for example, an oven 36 of the preferential heating type and the mold 40 is advantageously a multi-cavity mold able to mold several preforms 14 simultaneously in order to produce as many containers 12, in this instance in groups of four.

The oven 36 comprises transport means 42, such as a carousel, intended to transport the preforms 14 through the oven 36 so that the preforms 14 are heated as they travel by being exposed to greater or lesser extents to the radiation from infrared lamps (not depicted) in order to perform preferential heating.

This heating method whereby the preform 14 has portions that are heated differently according to a clearly determined heating profile, particularly according to the geometry of the container 12 that is to be produced, is known, as was recalled in the preamble, and will therefore not be described further in detail.

Each preform 14 is, for example, suspended from the inside of the neck 22 from a spinner 44 via which the preform 14 is rotated on itself about its vertical axis A.

The preforms 14 leave the oven 36 spaced apart by a first separation, known as PAS1, corresponding to the separation in the longitudinal direction separating the respective vertical axes A of two successive preforms, the value of the first separation PAS1 corresponding to the separation of the spinners 44 which is determined according to the diameter of the preforms 14.

Advantageously, the separation PAS1 is determined in such a way as to optimize the number of preforms 14 heated in the oven 36.

For preference, the molding unit 38 is equipped with a mold 40 comprising two half-molds 46a, 46b that can be moved translationally relative to one another at right angles to the longitudinally directed vertical parting line of the mold 40, each half-mold 46a, 46b for example comprising four half-cavities 48.

The linear apparatus 10 comprises at least a first transfer device 50 able to transport the preforms 14 from the exit of the preferential-heating oven 36 from which the preforms 14 are taken (loading) then conveyed as far as the mold 40 of the molding unit 38 where the preforms 14 are introduced into the mold 40 (unloading).

For preference, the apparatus 10 comprises, downstream of the molding unit 38, a unit 52 such as a filling unit (not depicted) and a sealing unit for applying closures to the filled containers. As an alternative, the unit 52 arranged at the exit from the apparatus 10 comprises means of removing or of accumulating (storing) the produced containers 12 for later filling and sealing.

Advantageously, the apparatus 10 comprises a second transfer device 50' intended to remove in the downstream direction the containers 12 that have been manufactured, that is to say able to pick up the containers 12 in a way that is synchronized with the opening of the mold 40, and then transfer them from the molding unit 38 to the unit 52.

In FIG. 1, the first, preform 14, transfer device 50 is represented by a first arrow "I" whereas the second, container 12, transfer device 50' is represented by a second arrow "II".

Advantageously, the transfer devices 50 and 50' are able to transfer a group of preforms 14 and a group of containers 12, each transfer device 50, 50' respectively comprising four modules or carriages able simultaneously to transfer a group of four preforms 14 or four containers 12.

Advantageously, the first transfer device 50 comprises connecting means capable of varying the longitudinal separation between the modules from the first separation PAS1 corresponding to the longitudinal separation between the preforms 14 at the time of loading to a second separation known as PAS2, greater than the first PAS1, and corresponding to the longitudinal separation needed between the preforms 14 to allow them to be unloaded into the mold 40 (see FIG. 1).

The connecting means and the modules will be described in detail later on and are depicted more specifically in FIGS. 10 to 13.

FIG. 2 gives an exploded view of the front part of a module of the preform 14 transfer device 50 according to a preferred embodiment of the invention.

The transfer device 50 comprises gripping means consisting of at least one gripper 54 able to collaborate with part of a preform 14 or of a container 12 in such a way as to allow said preform or said container to be transferred, particularly between the units or stations of the linear manufacturing apparatus 10.

The gripper 54 consists of two levers 54a, 54b which extend overall in the transverse direction orthogonal to the longitudinal direction of travel indicated by the arrow L in FIG. 1, the levers 54a, 54b of the gripper 54 extending in a substantially horizontal plane which is notably determined with respect to the position of the neck 22 of the preform 14.

The levers 54a, 54b, which in the figures are respectively the left and right levers, are mounted articulated about a vertical axis B between a position in which the gripper 54 is open (FIG. 8) and a position in which it is closed (FIG. 9).

The right lever 54b comprises a shaft 56 which extends vertically upward from the lever and around which is fitted a complementary cylindrical bushing 58 that the other, left, lever 54a comprises so that the shaft and the bushing constitute an articulation about the vertical axis B between the levers 54a, 54b.

As a preference, the gripper 54 comprises elastic return means 60 for returning the levers 54a, 54b toward said closed position.

Advantageously, the elastic return means 60 that return the levers 54a, 54b consist of a spring which, operating in compression, is here mounted at the rear transverse end of the gripper 54.

To do that, each lever 54a, 54b comprises, at its rear end, a fin 62a and 62b respectively, which, directed transversely, extends vertically upward from the horizontal reference plane containing the levers. Advantageously, each fin 62a, 62b comprises, on its internal vertical face 64a, 64b, a centering pin 66 for the spring constituting the means 60 of elastic return of the levers 54a, 54b, each pin 66 penetrating the end turns of the spring.

The spring bears at each of its ends against the internal vertical faces 64a, 64b of each fin 62a, 62b by means of which fins the spring urges the rear end of the levers 54a, 54b apart which, at the opposite end, causes the front ends of each lever 54a, 54b that form that part of the gripper 44 that is intended to perform the gripping, and also more usually known as jaws or jaw elements, to move transversely closer together.

As an alternative, the elastic return means 60 that return the levers 54a, 54b could be arranged transversely between the articulation (shaft 56, bushing 58) of the levers or between the articulation and the jaw-forming front end and it is possible for the elastic return means 60 to consist of any other appropriate equivalent member.

The levers of the gripper 54 respectively comprise, forward of the articulation (shaft 56, bushing 58), an upper horizontal face 68 which is flat overall and on which elements that will be described in detail later are intended to be mounted.

Advantageously, each lever of the gripper 54 is produced in two separate parts, the rear parts of the levers comprising the articulation 56, 58 and the elastic return means 60 and the front parts forming the two jaws of the gripper 54, hereinafter known as the jaws 70.

Each front part of the lever that forms one of the two jaws 70 is fixedly attached to the front end of the rear part of the corresponding lever 54a, 54b, for example using fasteners 72 such as screws.

For each gripper 54, it is therefore possible for the jaws 70 easily to be fitted on and removed from the levers which are intended to collaborate with the neck 22 of the preform 14 (or of the bottle 12) so as quickly for each application to adapt the geometric characteristics of the jaws 70 of the gripper 54 to suit the diameter and type of neck 22.

Advantageously, each jaw 70 internally comprises a vertical face 74 which, intended to collaborate with part of the neck 22 of the preform 14, has a complementary curved overall profile.

When the gripper 54 is in the closed position (FIG. 9), the vertical faces 74 of the jaws 70 internally delimit a circular overall opening 76, of a diameter slightly smaller than that of the neck 22 of the preform 14 that is to be transferred.

For preference, the jaws 70 of the gripper 54 are intended to collaborate with the groove 32 of the neck 22 of the preform 14 and the thickness of the jaws 70 is determined so that the part adjacent to each vertical face 74 can fit at least partially in-between the flange 28 and the bead 30, the jaws 70 of the gripper 54 thus gripping the neck 22 of the preform and being positioned above the flange 28.

As an alternative, the jaws 70 of the gripper are positioned under the radial flange 28 which, when the gripper 54 is in the closed position, rests against an adjacent part of the horizontal top face 78 of each of the jaws 70, the jaws 70 then exerting or not exerting a clamping force on the neck 22.

An alternative form such as this notably corresponds to the positioning of the transfer grippers according to the aforementioned prior art of FR-A-2.879.179.

It will be recalled that, in that document, a preform is picked up by forcibly fitting the gripper around that portion of the neck that is situated under the flange and that the opening of the gripper is the result of the collaboration between the jaws and the neck which causes them to part against the action of the elastic lever-return member.

It will therefore be appreciated that the use of such a gripper generally leaves, after the loading and unloading operations, visible marks on that portion of the neck that is situated under the flange or can even cause shavings of material, neither of which is satisfactory in terms of the quality of the manufactured finished container, particularly in terms of its esthetic appearance.

This is one of the reasons why the gripping of the neck 22 of the preform 14 or of the container 12 by the gripper 54 is advantageously performed in the groove 32 delimited by the flange 28 and the bead 30, when the neck 22 is of the type that comprises such a groove.

This is because even if the jaws 70 of the gripper 54 leave marks in the groove 32 of the neck 22, these marks are not visible on the filled finished container because they are then concealed by the tamperproofing band 29 housed in the groove 32.

However, gripping the neck 22 at the groove 32 demands control and precision in the loading and unloading operations in order notably to ensure that the gripper 54 does not damage either the adjacent flange 28 or the adjacent bead 30.

In addition, the transfer device 50, 50' according to the invention is more particularly intended to be fitted to a linear apparatus 10, like the one previously described and depicted in FIG. 1, in which the thermal conditioning unit 34 that heat treats the preform 14 comprises an oven 36 known as a preferential heating oven.

Now, the use of transfer grippers according to document FR-A-2.879.179 presents a major problem because, particularly during loading, introduction of the neck of the preform into the gripper may cause a rotational movement about the vertical axis A, and this is not permissible for a preform that is treated using a preferential heating method.

The result of this is that the preform 14, which is transferred downstream with a view to performing the blow molding operation, would no longer be in the determined angular position known as the reference position as it is unloaded, this unloading position corresponding to the position in which it is introduced into the mold.

Specifically, it will be appreciated that the angular offsetting of the more greatly or less heated portions of the body of the preform with respect to this reference position, determined as a function of the mold, will result, after the preform 14 molding operation, in the creation of a container 12 that is non-compliant.

According to the invention, the transfer device 50, 50' comprises a mechanism 80 for selectively instigating the opening and closing of the gripper 54 around the neck 22 of the preform 14 or of the container 12 during the loading and unloading operations.

Advantageously, the transfer device 50 according to the invention particularly makes it possible for each preform 14 to be transported from the exit from the oven 36 as far as the mold 40 while at the same time precisely keeping each of the preforms in said reference angular position.

The mechanism 80 comprises at least one separating member 82 for separating the levers 54a, 54b, which is intended to be driven by a driving link 54 which is pivot-mounted about a shaft 86, the driving link 84 that drives the separating member 82 comprising at least one free end 88 which is able to collaborate with first actuating means 90 (FIG. 10) intended to cause the gripper 54 to open against the action of the elastic return means 60 that return the levers, known as the first elastic return means.

The mechanism 80 further comprises associated locking means 92 which are mounted so as to be able to move between:
- a locked position in which the gripper 54 is kept in the open position (FIG. 8), and
- a retracted position in which the gripper 54 is free to close (FIG. 9), the locking means 92 being able to collaborate with second actuating means 94 intended to cause the locking means 92 to move from the locked position to the retracted position so as automatically to initiate the closing of the gripper 54.

A preferred exemplary embodiment of the mechanism 80 according to the invention, the various components of which are notably illustrated in an exploded view in FIG. 2 et seq. and then illustrated assembled in FIGS. 8 and 9 which respectively depict the open and closed positions of the gripper 54, will now be described in greater detail.

For preference, the mechanism 80 comprises a plate 96 on which to mount the various components, particularly the separating member 82, its driving link 84 and the locking means 92.

The separating member 82 has been depicted in detail in FIGS. 3A to 3C.

The separating member 82 extends vertically about a main axis C depicted as being vertical. The separating member 82 comprises an upper part consisting of a vertical rod forming the shaft 86 about which the driving link 84 is pivot-mounted, the play-free rotational drive between the driving link 84 and the separating member 82 being achieved through a collaboration of shapes.

For preference, the shaft 86 comprises at its upper end two flats 98, said upper end of the shaft 86 being housed with the interposition of intermediate elements in a complementary housing (not depicted) that the driving link 84 comprises.

As an alternative, the shaft 86 is secured to the driving link 84 and able to collaborate with part of the separating member 82 in order to rotate it about the vertical axis C.

The separating member 82 comprises, at its lower end, a parting member 100 which is able to act on the levers 54a,

54b. The parting member 100 here has the form of a rectilinear wall extending vertically downward from the lower face of an intermediate part 102 of the separating member 82.

The intermediate part 102 has the overall shape of a horizontal disk connecting the parting member 100 and the lower end of the shaft 86 and which extends circumferentially around the shaft 86.

The rear part 104 of the disk constituting the intermediate part 102 is beveled thus forming a V-shaped profile which in this instance is not symmetric so that the separating member 82 does not, as it pivots about the vertical axis C, interfere with other adjacent components such as the articulation, consisting of the shaft 56 and of the bushing 58, between the levers of the gripper 54.

The parting member 100 comprises, laterally on each side, a planar vertical lateral face 106a and 106b on the left side and on the right side respectively, each of these being intended to collaborate with an associated roller 108a, 108b.

The rollers 108a, 108b are respectively mounted, for example via rings 107 and screws 109a, 109b, in complementary holes 111 that each of the levers 54a, 54b comprises in its horizontal upper face 68.

As illustrated in FIGS. 3A and 3C, when the gripper 54 is in the open position, the parting member 100 of the separating member 82 at the front bears via part of its lateral face 106b against the right roller 108b and, at the rear, bears via part of its lateral face 106a against the left roller 108a so that when the separating member 82 is rotated toward the closed position, each of the rollers 108a, 108b will roll against the lateral face 106a, 106b associated with it, in the opposite direction to the other roller.

In the closed position, part of the lateral face 106a of the parting member 100 butts against stop means 110, consisting for example of a pin positioned forward of the roller 108a and which is mounted on the left lever 54a, for example force-fitted into a hole that the horizontal upper face 68 of the lever comprises.

The plate 96 depicted in FIGS. 2 and 4 and to which numerous components are attached will now be described.

The plate 96 comprises, at its forward transverse end, an orifice 112 through which the shaft 86 passes in such a way that the separating member 82 is mounted beneath the plate 96 while the driving link 84 is arranged above it.

Advantageously, the separating member 82 rotates as one with the driving link 84 so that the assembly formed by the separating member 82 and the driving link 84 is able to pivot about the vertical shaft 86 between, respectively:

an active position corresponding to the locked position of the locking means 92, and in which the separating member 82 is kept by the locking means 92 in order to urge the levers 54a, 54b against the action of the spring that forms the first elastic return means 60, into the position in which the gripper 54 is open, and a passive position, corresponding to the retracted position of the locking means 92, and in which the parting member 100 of the released separating member 82, which is urged by the elastic return means 60, collaborates notably with the pin that forms the stop means 110 that determine the closed position of the gripper 54.

The plate 96 comprises, to the rear of the orifice 112 through which the shaft 86 of the assembly formed by the separating member 82 and the driving link 84 passes, another orifice 114 through which the shaft 56 borne by the lever 54b to form the articulation between the levers 54a, 54b of the gripper 54 about the vertical axis B passes in full or in part.

The orifices 112, 114 are more or less aligned in the transverse direction so that the axes of rotation B and C of, respectively, the assembly formed by the separating member 82 and the driving link 84 and the levers 54a, 54b are contained in one and the same transversely oriented vertical plane.

The plate 96 comprises, to the rear of the orifice 114, a transverse groove 116 into which the front end of a transverse rail 118 fixed to the plate by screws is introduced, the rail 118 comprising, like the bottom of the groove 116, two holes 119 for the passage of the screws 120.

The rail 118 belongs to transmission means capable of allowing the subassembly formed by the gripper 54 and its mechanism 80 to move in the transverse direction orthogonally with respect to the longitudinal direction L of travel, which transmission means will be described later on.

The plate 96 comprises, on the left side, adjacent to the groove 116 for the attachment of the rail 118, on the one hand, a drilling 122 for mounting a cam follower 124 which again will be described later in conjunction with the movement transmission means to which it belongs and which are able to allow a movement in said longitudinal direction L of travel and, on the other hand, a casing 126 comprising a cavity 128 open transversely at each front and rear end and which is intended for the mounting of second elastic return means which will be described hereinafter in conjunction with the locking means 92 to which they belong.

One preferred exemplary embodiment of the locking means 92 which, combined with the separating member 82 and with the driving link 84, mainly constitute said mechanism 80 of the transfer device 50 according to the invention will now be described more specifically.

The locking means 92 comprise a locking pawl 130 which is mounted to move between the retracted position and the locked position.

The locking pawl 130 is urged toward the locked position by second elastic return means 132 which consist, for example, of a second helical spring operating in compression.

As illustrated in FIG. 5, the spring constituting the second elastic return means 132 for elastically returning the locking pawl 130 is mounted inside the cavity 128 of the casing 126 via a plurality of means 133, 135, 137 including a support rod 133 comprising, at its front end, a bearing head 134 able to collaborate with the locking pawl 130 in order to apply, transversely forward, a return force returning toward the locked position.

For preference, the means for mounting the spring that constitutes the second elastic return means 132 further comprise a bushing 135 and another support rod 137 which can be screw-fastened at its front end to the front support rod 133 in such a way that it, with the bushing 135, places the spring that constitutes the second elastic return means 132 under load.

The locking pawl 130 collaborates with a complementary notch 136 to immobilize the assembly formed by the separating member 132 and the driving link 84 against the action of the spring that forms the first elastic return means 60.

The locking means 92 comprise an instigating element 138 that instigates the closing of the gripper and which is able selectively to collaborate with the first actuating means 90 to bring about unlocking.

The first actuating means 90 are able selectively to act on the instigating element 138 to cause unlocking by moving the locking pawl 130 from the locked position to the retracted position against the action of the second spring that forms the second elastic return means 132 so that by releasing the assembly formed by the separating member 82 and the driving link 84, the spring that forms the first elastic return means 60 of the levers 54a, 54b causes the gripper 54 to close automatically.

For preference, the closure instigating element 138 and the locking pawl 130 are mounted secured to the free end of a support arm 130 which is pivot-mounted, at its bushing-shaped other end 142, about a vertical axis that coincides with the vertical axis B of the articulation 56, 58 of the levers, via elements 144.

The elements 144 that form the vertical axis, by means of which the end 142 of the support arm 140 pivots about the vertical axis B, are mounted in the orifice 114 of the plate 96.

The free end 146 of the support arm 140 comprises a bearing face 148, here arranged vertically behind the free end 146, able to be urged by the spring that constitutes the second elastic return means 132 of the locking means 92 by means of the front vertical face of the bearing head 134. The bearing face 148 collaborates directly with the front vertical face of the bearing head 134 that the spring that constitutes the second elastic return means 132 urges transversely forward, via the bushing 135.

For preference, as illustrated in FIG. 6, the bearing face 148 consists of a hemispherical surface belonging to the head 150 of a "drawing pin" or "thumb tack" pin 152 that has a transverse shank 154 which, secured to the head 150, is housed transversely in a complementary housing 156 of the free end 146 of the support arm 140.

The complementary housing 156 runs generally transversely across the free end 146 of the support arm 140, from the rear vertical surface 157 against which the opposite face of the head 150 to the hemispherical surface that constitutes the bearing face 148 bears, until it emerges here at the front of the arm.

Advantageously, the hemispherical surface that constitutes the bearing face 148 of the pin 152 makes it possible to maintain constant contact with the front face of the bearing head 134 as the support arm 140 pivots about the axis B between its extreme positions corresponding to the locked and unlocked positions.

For preference, the locking pawl 130 consists for example of an annular ring and the instigating element 138 that instigates closure of the gripper 54 consists of a roller.

The locking pawl 130 and the roller that forms the instigating element 138 are mounted on a support rod 158 which extends vertically and which passes through a complementary hole 161 situated at the free end 146 of the support arm 140.

The support rod 158 is mounted as a through-component so that the roller that forms the instigating element 138, which is mounted at the upper end of the support rod 158, extends vertically above the support arm 140, whereas the locking pawl 130, which is mounted at the lower end thereof, extends vertically below the support arm 140.

A nut 159 is attached to the lower end of the support rod 158 to keep in position the roller that forms the instigating element 138 and the locking pawl 130.

The driving link 84 of the separating member 82 comprises at its free end 88 an instigating element 160 that instigates the opening of the gripper 54 and which is able to collaborate selectively with the second actuating means 94.

The instigating element 160 that instigates the opening of the gripper 54 is able, when urged by the second actuating means 94, to cause the separating member 82, and therefore the parting member 100, to move from the passive position into the active position that corresponds to the open position of the gripper 54.

Just like the closure-instigating element 138 borne by the support arm 140 and as illustrated by FIGS. 2 and 7A-7B, the instigating element 160 that instigates the opening of the gripper 54 consists of a roller which is mounted on a vertical support rod 162 which passes through a hole 164 in the free end 88 of the link 84.

A washer 163 is interposed here between the roller that constitutes the instigating element 160 and the upper face of the link 84 surrounding the hole 164; a nut 165 for example is attached to the end of the vertical support rod 162 in order to hold the assembly together.

Advantageously, the roller that constitutes the instigating element 160 that instigates the opening of the gripper extends above the driving link 84, overall in a horizontal plane like the roller that forms the instigating element 138.

The driving link 84 has a free end 88 bearing the roller that constitutes the instigating element 160 that instigates the closing of the gripper 54 and an opposite end 166 which is mounted articulated about the vertical axis C common to the vertical shaft 86 of the separating member 82.

For preference, the mechanism 80 comprises a lever 170 comprising an end 168 which is connected to the articulated end 166 of the driving link 84 so that said lever 170 rotates as one with the driving link 84, that is to say moves as one therewith in the movements about the axis C between the active and passive positions of the assembly formed by the separating member 82 and the driving link 84.

As an alternative, the notch 136 is created directly in the end 166 of the driving link 84 or in the separating member 82, for example in the shaft 86 or alternatively the disk 102.

Advantageously, the notch 136 has a V-shaped profile that complements the locking pawl 130 formed by the ring, the profile of the notch 136 comprising a rear vertical face 174 and a front vertical face 176 with which part of the locking pawl 130 collaborates when, with the locking means 92 in the locked position, the pawl enters the notch 136.

In an alternative form illustrated in FIG. 7B, the lever 170 comprises a notch 136 that forms an additional catch for the locking pawl 130 and which, being positioned at the free end 172 thereof that is at the opposite end to the end 168, extends radially from the driving link 84 to which it is secured. The notch 136 does not have a V-shaped profile with faces 174, 176 but has a face 175.

When the locking means 92 are in the locked position, the locking pawl 130 collaborates with the surface delimited by the faces 174, 176, respectively 175, of the notch 136.

For preference, the lever 170 comprises a guiding surface 178 which is adjacent to the front vertical face 176 of the notch 136 and against which the locking pawl 130 bears when the locking means 92 are in the retracted position.

The locking pawl 130 comprises an external annular surface 180 which here is in permanent contact with the surface consisting of the faces 174, 176 or the guiding surface 178 depending on the position occupied by the locking means 92, that is to say whether the position is the locked position or the retracted position.

FIGS. 8 and 9 depict a gripper 54 with the entire mechanism 80 assembled, and respectively illustrate the locked position corresponding to the open position of the gripper 54 and the retracted position corresponding to the closed position of the gripper 54.

In order to proceed with closing the gripper 54, it is necessary to move the locking means 92 from the locked position into the retracted position in order to free the assembly formed by the driving link 84 and the separating member 82 which is then able to be moved from the active position to the passive position under the action of the elastic return force applied by the elastic return means 60 to the levers 54a, 54b and therefore to the parting member 100 via the rollers 108a, 108b.

To do this, the roller that forms the instigating element 138 is urged transversely rearward by the first actuating means 90 so that the transverse closure force F applied, from front to back, on this roller causes the support arm 140 to pivot in the clockwise direction about the axis B and against the action of the spring that constitutes the second elastic return means 132 and therefore causes the locking pawl 130, secured to the roller and to the support arm 140, to move out of the notch 136.

During this movement to close the gripper 54, the external annular surface 180 of the locking pawl 130 will travel over the rear vertical face 174 of the notch 136 until it leaves the notch 136 whereupon it simultaneously comes into contact with the front vertical face 176.

In order to proceed with opening or re-opening the gripper 54, the roller that constitutes the element 160 that instigates the opening of the gripper 54 is urged by the first actuating means 90 in such a way that the force applied to this roller causes the driving link 84 to pivot about the axis C in the counterclockwise direction, that is to say also causes the separating member 82 to move, against the action of the elastic lever-return means 60, from the passive position to the active position.

At the same time, because the lever 170 comprising the notch 136 moves as one with the driving link 84, the locking pawl 130 travels, from front to rear, over the ramp-forming guiding surface 178 until the locking pawl 130 pivots into the notch 136 in the locked position: this pivoting occurs when the active position is reached simultaneously by the driving link 84 and the separating member 82, and has the effect of bringing the gripper 54 into the open position.

The transfer device 50 according to the invention is more specifically intended, as illustrated in FIG. 1, to be fitted to a linear-type apparatus 10 for the manufacture of containers 12 from preforms 14, the apparatus 10 mainly comprising the thermal conditioning unit 34 and the molding unit 38.

Advantageously, the first transfer device 50 of the apparatus 10 comprises a group of modules 182 able simultaneously to transfer a group of preforms 14 from a loading zone 184 situated at the exit from the oven 36 of the thermal conditioning unit 34 as far as the mold 40 of the molding unit 38.

FIGS. 10 and 11 depict one exemplary embodiment of a transfer device 50 comprising a group of four modules 182 able simultaneously to transfer a group of four preforms 14.

According to the invention, each module 182 of the first, preform 14, transfer device 50 comprises a gripper 54 the opening and closing of which are instigated selectively by means of a mechanism 80, described earlier, by virtue of which each preform 14 is transferred, keeping it in a determined angular position from the time that it is loaded to the time that it is unloaded into the mold 40.

For preference, at least the modules 182 of the first, preform, transfer device 50, are connected to one another by means of connecting means 186 capable of varying the longitudinal separation separating two successive modules 182, between the first separation, known as PAS1, that corresponds to a contracted configuration of the modules illustrated by FIG. 10, and the second separation, known as PAS2, corresponding to a deployed configuration of the modules illustrated by FIG. 11.

FIGS. 12 and 13 depict in detail a module 182 of the preform 14 transfer device 50 comprising a preferred exemplary embodiment of the connecting means 186 intended to allow the variation from the separation PAS1 to the separation PAS2 and vice versa.

Such connecting means 186 are advantageously similar to those described in document FR-A1-2 879 179 filed in the name of the Applicant Company and to which reference may be made for a detailed description of the connecting means 186 and how they work.

The connecting means 186 comprise a lever 188 mounted to rotate on one of the modules 182 about a vertical axis D substantially perpendicular to the longitudinal direction L of travel, this lever 188 comprising two parts, respectively a left link 188a and a right link 188b which extend one on each side of the axis D.

The left link 188a of the lever is equipped at a free end 190 with a first pawl 192, for example a roller, able to run in a groove 194 formed transversely on the other of the modules 182.

The right link 188b of the lever is equipped at a free end 196 with a second pawl 198, for example a second roller, and the apparatus 10 comprises a bearing structure 200 that has a channel 202, arranged longitudinally, in which the second pawl 198 runs.

The channel 202 comprises a downstream portion 202A and an upstream portion 202C which, both being substantially parallel to the longitudinal direction L of travel, are connected to one another via a curved and substantially oblique intermediate portion 202B that makes a variable angle α with respect to the longitudinal direction L of travel.

The apparatus 10 comprises at least first transmission means 204 able to move the first, preform, transfer device 50 in the longitudinal direction and second transmission means 206 able to move the grippers 54 of the modules 182 of the first, preform, transfer device 50 in a transverse direction orthogonal to the longitudinal direction L of travel in the linear apparatus so as to load or unload the preforms 14.

As illustrated in FIGS. 10 to 13, the first transmission means 204 preferably comprise two rails, respectively a front rail 210a and a rear rail 210b, which extend longitudinally, parallel to the longitudinal direction L of travel, and which are secured to the bearing structure 200 of the apparatus 10, each module 182 of the preform 14 transfer device 50 comprising two sliders 212a, 212b by means of which the modules 182 are attached to the rails 210a, 210b.

Advantageously, the first transmission means 204 comprise associated drive means (not depicted), such as a belt coupled to a motor and fixed to at least one of the modules 182, for example via a flange, so as to cause the group of modules 182 of the preform 14 transfer device 50 to move in the longitudinal direction L.

For preference, the second transmission means 206 comprise at least one actuator, such as an electric motor, able selectively to cause the rail 118 secured to the plate 96 of each module 182 to move in the transverse direction in such a way that the rail 118 slides telescopically between an extreme rear position illustrated in FIG. 12 and an extreme forward position illustrated in FIG. 13, the movement of the rail 118 causing the gripper 54 and the mechanism 80 to move forward or back with respect to the bearing structure 200 and to the first transmission means 204.

By way of an alternative, the second transmission means 206 comprise at least one actuator consisting of any appropriate means, for example a pneumatic or hydraulic jack, etc.

The apparatus 10 comprises, downstream of the first, the second transfer device 50' which comprises a mechanism 80' similar to the mechanism 80 described earlier but which is intended to transfer the containers 12 in the downstream direction, in this instance to transfer simultaneously the group of four containers 12 manufactured by the molding unit 38 and which comprises a group of four modules 182'.

By convention, the elements of the transfer device 50' that are similar to the transfer device 50 are denoted by the same references to which the prime symbol (') has been added.

As illustrated by FIG. 14, the mechanism 80' of the bottle 12 transfer device 50' differs from the mechanism 80 only in that the arrangement of the components is the reverse with respect to a transversely oriented vertical plane.

By way of example, in the mechanism 80, the closure instigating element 138 is on the left or the downstream side and the opening instigating element 160 is to the right or on the upstream side whereas in the case of the mechanism 80', the closure instigating element 138' is on the right or on the upstream side and the opening instigating element 160' is on the left or on the downstream side in the longitudinal direction L of travel.

Because all the components of the mechanism 80' are in all respects similar to those of the mechanism 80 and it operates in the same way, these components will not be described further in detail.

The bearing structure 200 of the apparatus 10 comprises transmission means able to move the second, container 12, transfer device 50' in the longitudinal direction L.

Advantageously, said transmission means of the second transfer device 50' consist of the first transmission means 204 of the first, preform, transfer device 50.

Because of the commonality of transmission means 204, the preform 14 transfer device 50 and the container 12 transfer device 50' are able to operate such that they are perfectly synchronized with one another in their movements in the longitudinal direction L.

In addition, the commonality also makes it possible, in general terms, to reduce the costs of manufacture of the apparatus 10 and simplify its operation and maintenance.

For preference, the bearing structure 200 of the apparatus 10 comprises second transmission means 208 able to move the grippers 54' of the modules 182' of the second, container 12, transfer device 50' in a transverse direction orthogonal to the longitudinal direction L of travel in such a way as to load or unload the containers.

Advantageously, the four modules 182' that form the transfer device 50' are secured to a first longitudinal support 214, such as a support arm, which is fixed to the rear part of the plates 96' of each module 182'. The modules 182' are separated from one another by a fixed longitudinal distance corresponding to the separation PAS2, that is to say the longitudinal separation between the axes A of two successive containers 12.

This is because in the case of the second transfer device 50' there is no need to provide connecting means 186 that would allow the separation between the modules to be varied as was the case with the first transfer device 50.

As illustrated in FIG. 14, the transfer device 50' comprises two pairs of two sliders 212'*a*, 212'*b* able to collaborate with the rails 210*a*, 210*b* of the bearing structure 200 and which are respectively associated with the first and with the third modules 182'.

The sliders 212'*a* and 212'*b* are secured to the upper horizontal face of a second, rear, longitudinal support bar 216 and to the lower horizontal face of which the second transmission means 208 of the transfer device 50' are fixed.

The second transmission means 208 comprise at least two actuators 208*a*, 208*b* able to instigate telescopic deployment of the two rails 118' associated with the first and third modules 182'.

Advantageously, because the four modules 182' are notably secured to the longitudinal support 214, the transmission means 204 and 208 are small and here associated with the first and third modules 182' without there being any need to provide means for each of the modules as was the case of the modules 182 of the transfer device 50.

The rear longitudinal support bar 216 comprises, on its upper horizontal face, flanges 218 for the attachment of a belt (not depicted) advantageously one that can be driven by a motor.

The rear longitudinal support bar 216 comprises an upstream free end 220 intended to be connected to the preform 14 transfer device 50, particularly to the fourth module 182 situated further downstream, for example using bolts 221.

FIG. 15 depicts in detail the first and second actuating means 90 and 94 which are intended selectively to instigate the opening and closing of the grippers 54 and 54' of the transfer devices 50 and 50'.

For preference, the actuating means 90, 94 with which the apparatus 10 is equipped are mounted secured to the bearing structure 200 and are therefore not carried along with the longitudinally and transversely moving parts of each of the transfer devices 50, 50'.

Advantageously, the first actuating means 90 are intended to be arranged at the loading zone 184 at the exit from the oven 36 so as simultaneously to collaborate with the closure instigating element 138 of each gripper 54 in order selectively to instigate closure of the jaws 70 of the gripper when the jaws 70 are in a determined position around the neck 22 of each preform 14 that is to be transferred.

For preference, the first actuating means 90 are mounted secured to the bearing structure 200 via a support 91 and consist of a longitudinal bar comprising a vertical actuating face 222.

Advantageously, the second actuating means 94 are arranged longitudinally at the molding unit 38 so as to collaborate with the element 160 that instigates the opening of each gripper 54 in order selectively to instigate the opening of each gripper of the first transfer device 50 when the preforms 14 are immobilized in the mold 40 without being able to leave the reference angular position.

For preference, the second actuating means 94 arranged at the molding unit 38 are also able to collaborate with the element 138' that instigates the closure of each gripper 54' of the second transfer device 50', so as selectively to instigate the closing of each gripper 54' around the neck of the manufactured container 12 intended to be transferred to the unit 52 downstream, for example to a filling unit.

Advantageously, the second actuating means 94 are mounted so as to be able to move between a first actuating position and a second actuating position so as to collaborate selectively with the element 138' that instigates the closing of each gripper of the second, container 12, transfer device 50', in the first position, and with the element 160 that instigates the opening of each gripper 54 of the first, preform 14, transfer device 50, in the second position.

For preference, the second actuating means 94 consist of members 224, in this instance four of them like the modules, connected to one another by a longitudinal catching bar 225.

The four members 224 are mounted on the bar 225 with a determined separation between two consecutive members 224 and each member 224 has a vertical instigating face 226 (see FIGS. 17 and 23) which extends below the bar 225 in a distinct horizontal plane.

The bar 225 bearing the members 224 is mounted articulated at each of its longitudinal ends via a first link 228 and a second link 230 which are arranged respectively at the downstream and upstream ends of the bar 225.

The first link 228 has an end which is pivot-mounted about a vertical axis on the downstream end of the bar 225 and the other end of which is pivot-mounted on part of the support means 232 which, secured to the bearing structure 200 of the apparatus 10, are intended to allow for the mounting of the second actuating means 94.

The second link 230 is L-shaped and comprises a link element 231 which is mounted like the first link 238. The link element 231 has an end which is pivot-mounted about a vertical axis on the upstream end of the bar 225 and the other end of which is pivot-mounted on another part of the support means 232.

The second link 230 comprises another link element 233, forming the other bar of the L, one end of which is secured, like the link element 231, to the upstream end of the bar 225 and the free other end of which is able to collaborate with actuating means, such as at least one actuator 234.

The actuator 234 consists, for example of a pneumatic jack, with an alternative of a hydraulic jack, comprising an actuating rod 236 the free end of which is mounted articulated on the free end of the link element 233 of the second link 230.

The actuator 234 is operated in such a way as selectively to move the rod 236 of the jack between a retracted position and a deployed position in which the rod 236 extends out of the body of the cylinder of the jack.

The movement of the rod 236, from its retracted position into its deployed position, causes the second link 230 to move about its axis, which causes the movement of the assembly formed by the first link 228 and the catching bar 225 bearing the members 224, and the movement from the first actuating position to the second actuating position which corresponds to a downstream translational movement in the longitudinal direction L.

In the first position of actuation of the second means 94, each member 224 is intended to collaborate via its vertical instigating face 226 with the element 138' that instigates the closing of each gripper 54' of the second, container 12, transfer device 50', whereas in the second position, each member 224 is intended to collaborate via its vertical instigating face 226 with the element 160 that instigates opening of each gripper 54 of the first, preform 14, transfer device 50.

According to an alternative form that has not been depicted, the actuator 234 is an electric motor able to urge the second link 230 in order to cause a translational movement of the bar 225 and of the members 224 in the longitudinal direction.

Advantageously, the use of an actuator 234 of the electric motor type notably makes it possible to eliminate the risks of leaks inherent in the use of pneumatic or hydraulic fluid.

The apparatus 10 comprises third actuating means 238 depicted in FIG. 16 which are arranged longitudinally at the unit 52 and are mounted secured to the bearing structure 200 via support elements 240, 241.

The third actuating means 238 are able to collaborate with the container 12 transfer device 50', notably in order selectively to instigate the opening of the grippers 54' in order to release the necks 22 of the manufactured containers 12 coming from the mold 40.

For preference, the third actuating means 238 comprise actuating members 242, of which there are four as there are modules 182', which are connected via a catching bar 244 which runs longitudinally parallel to the direction L of travel.

Each actuating member 242 comprises a vertical actuating face 246 able to collaborate with an element 160' that instigates the opening of the gripper 54'.

The bar 244 is mounted such that it can move via a first link element 248 and a second link element 250 which linkages are respectively of substantially transverse orientation.

The first link element 248 is pivot-mounted at one end on a support element 240 about a vertical axis and is connected at its other end by a vertical connecting element 252 to the downstream part of the bar 244.

The second link element 250 is pivot-mounted at one end on another support element 241, about a vertical axis, and is connected at its other end via a vertical connecting element 253 to the upstream part of the bar 244.

The bar 244 bearing the actuating members 242 is thus mounted articulated with respect to the support elements 240, 241 secured to the bearing structure 200 and is capable of a translational movement in the longitudinal direction L between a first position and a second position known as the actuating position corresponding to the opening of the grippers 54'.

The third actuating means 238 comprise at least one actuator 254 which is mounted secured to a support element 243. This actuator 254 consists for example of a pneumatic jack comprising an actuating rod 256 that can be made to move between a retracted position and a deployed position.

The free end of the actuating rod 256 is able to collaborate with the end of the second link element 250 in order, via the connecting element 253, when the rod is moved from its retracted position into its deployed position, to make the bar 244 bearing the actuating members 242 move.

More specifically, the movement of the actuating rod 256 into its deployed position causes the bar 244 and the actuating members 242 to move from the first position to the second position known as the actuating position, in which each vertical actuating face 246 of an actuating member 242 collaborates with the element 160' that instigates the opening of the gripper 54' of each module 182' of the transfer device 50' so as to unload the manufactured containers 12.

FIG. 17 et seq. partially depicts the transfer devices 50 and 50' with which an apparatus 10 is fitted.

It will be further specified that, as illustrated in FIG. 10 or 17-18, each cam follower 124 of a module 182 is housed in a rail comprising a complementary camway 258 which runs in a straight line in the longitudinal direction L of travel but which is able to move transversely with the preform 14 transfer means 50.

Likewise, each cam follower 124' of a module 182' is housed in a rail comprising a complementary camway 260 which runs in a straight line in the longitudinal direction L of travel but which is able to move transversely with the container 12 transfer means 50'.

The way in which the actuating means 90, 94 and 238 intended to collaborate with the mechanisms 80, 80' with which the grippers 54, 54' of the transfer devices 50, 50' are equipped work will be better understood from the following description of a transfer cycle within the apparatus 10.

FIG. 17 depicts the linear apparatus in the initial state corresponding to the start of a transfer cycle of which the first step, known as the preform loading step, will be described hereinafter by comparing FIGS. 17 and 18.

A group of four preforms 14 is first of all brought from upstream out of the oven 36 of the thermal conditioning unit 34 as far as the loading zone 184 situated downstream, so that there it can be loaded by the transfer device 50.

In the loading zone 184, the preforms 14 are aligned in the longitudinal direction L of travel, spaced longitudinally apart by a separation PAS1 here determined by the separation between the spinners 44 and are each in the reference angular position determined by the preferential heating operation performed in the oven 36.

The transfer device 50 is initially positioned longitudinally facing the loading zone 184 awaiting the arrival of such a group of preforms 14, the position of each module 182 being determined in such a way that it coincides with the preform 14 associated with it in the loading zone 184.

When the preforms 14 are in a position to be loaded in the loading zone 184, the second transmission means 206, preferably consisting of actuators of the electric motor type, are then operated in such a way as to move each of the modules 182 of the transfer device 50 simultaneously transversely forward, the transverse forward movement of the grippers advantageously being synchronized with the movement of the preforms in the longitudinal direction.

Specifically, the preforms travel continuously through the oven 36 which means that the parameters used to control the movement of the transfer device 50 are determined according to the oven operating parameters (speed, etc.).

During this first step, the first transmission means 204 are immobile so that the sliders 212a, 212b of each module 182 remain in the initial position with respect to the rails 210a, 210b.

Each actuator that makes up the second transmission means 206 is operated in such a way as to cause the forward movement of the rail 118 of each module 182 at the end of which the gripper 54 and the mechanism 80 that instigates its opening and closing are mounted.

Each rail 118 deploys telescopically from its extreme rear position depicted in FIG. 17 until it reaches the extreme forward position depicted in FIG. 18.

It will be recalled that each gripper 54 is initially held in the open position by the locking means 92 against the action of the elastic lever-return means 60.

Figure 23:
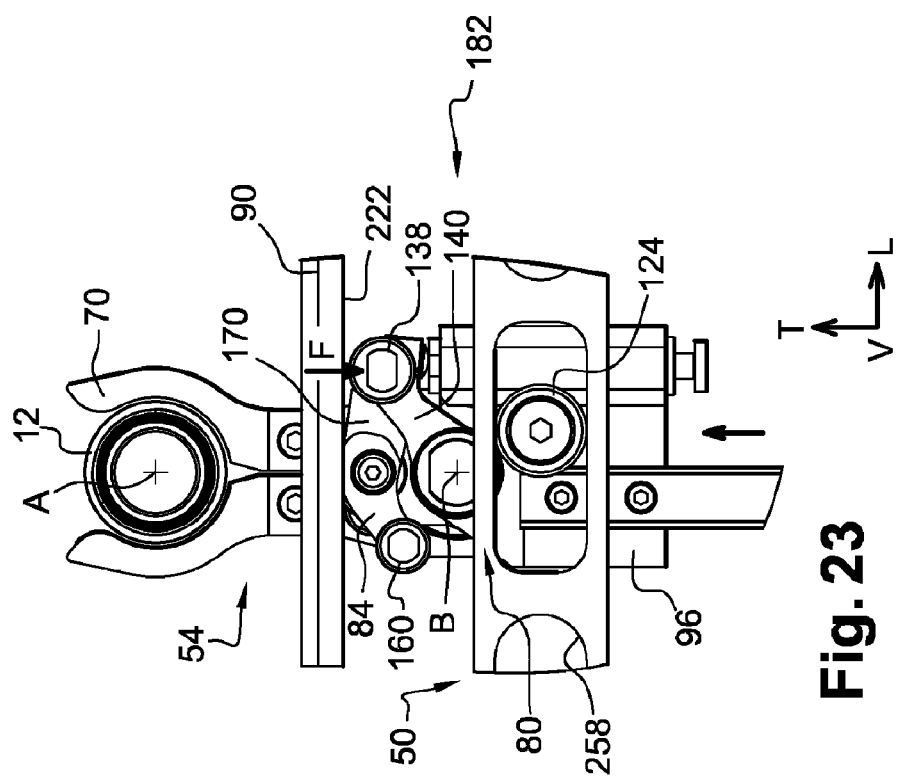

However, as the grippers 54 advance toward the loading zone 184, each closure instigating element 138 will reach the end of its travel in contact with the vertical actuating face 222 that forms the first actuating means 90, as is illustrated by FIG. 23.

Contact between each instigating element 138 and the vertical actuating face 222 of the first actuating means 90 means that a generally transverse force F, known as the closure force, is applied to the instigating element 138 by action/reaction.

This closure force F causes the instigating element 138 to retreat and therefore causes the support arm 140 which bears the locking pawl 130 to move, which locking pawl then pivots in the clockwise direction about the vertical axis B.

The force F applied by the first actuating means 90 to the instigating elements 138 of each module 182 therefore causes the locking means 92 to move against the action of the elastic return means 132, from the locked position into the retracted position.

When the retracted position is reached, the locking pawl 130 is out of the notch 136 and the assembly formed by the separating member 82 and the driving link 84, urged by the elastic return means 60, moves toward its passive position which is reached when the parting member 100 is in abutment against the pin that constitutes the stop means 110.

Of course, the first actuating means 90 are positioned in such a way that the grippers 54 initially in the open position each engage around the necks 22 of the preforms 14 before the action by the vertical actuating face 222 of the first means 90 on the closure instigating elements 138 causes automatic closure by unlocking.

Thanks to the selective control of the unlocking of the locking means 92, closure of the jaws 70 of each gripper 54 around the neck 22 of the preform 14 can be instigated automatically without there having been any chance for the reference angular position of the preform 14 to have been modified during this loading operation and in the certainty, because of the clamping force applied by the jaws 70 to the neck, that this reference position will be maintained during the transfer to the molding unit 38.

During this first step of the transfer cycle which is illustrated in FIGS. 17 and 18, the container 12 transfer device 50' is immobile, the mold 40 being normally closed and a blow molding operation of the group of four preforms 14 being in progress, which group of four preforms 14 will have been transferred previously by the transfer device 50 during a second step of the transfer cycle which will be described now.

For preference, the container manufacturing apparatus 10 is of the type comprising a molding unit 38 in which the preform 14, already injection molded, is heated in the oven 36 then blow molded or stretch-blow molded in a single operation in order directly to obtain a shaped end container 12.

As an alternative, the end container 12 may be obtained in a manufacturing method which involves a number of distinct steps of blow molding or of stretch-blow molding in order to convert the preform 14 into at least one intermediate container (not depicted) before the end container is obtained.

A method of manufacture such as this is described, for example, in documents EP-A-0 442 836 or U.S. Pat. No. 5,229,042 to which reference may be made for fuller details.

The second step in the transfer cycle will now be described by comparing FIGS. 18 and 19.

During the second step, the first transmission means 204 are operated in such a way as to move the preform 14 transfer device 50 and the container transfer device 50' in the longitudinal direction L of travel using common drive means (not depicted), such as a belt driven by a motor.

As can be seen from FIG. 19, the transfer device 50 is moved downstream, freeing up the loading zone 184 for the influx of the next group of preforms and the transfer device 50' is moved so that it is positioned to coincide longitudinally with the mold 40 (not depicted) of the molding unit 38 so that the grippers 54' of the modules 182' are transversely aligned with the necks 22 of the containers 12 that they are intended to transfer in the downstream direction to the unit 52.

When the transfer device 50' is positioned longitudinally, the actuators 208a, 208b that form the second transmission means 208 are then operated in order to deploy transversely forward the rails 118' which are moved telescopically from the rear rest position depicted in FIG. 17 or 18 until they reach the forward grasping position depicted in FIG. 19.

When the forward grasping position is reached, the rails comprising the camways 258 and 260 in which the cam followers 124 and 124' run are longitudinally aligned, forming a straight raceway.

Figure 24:
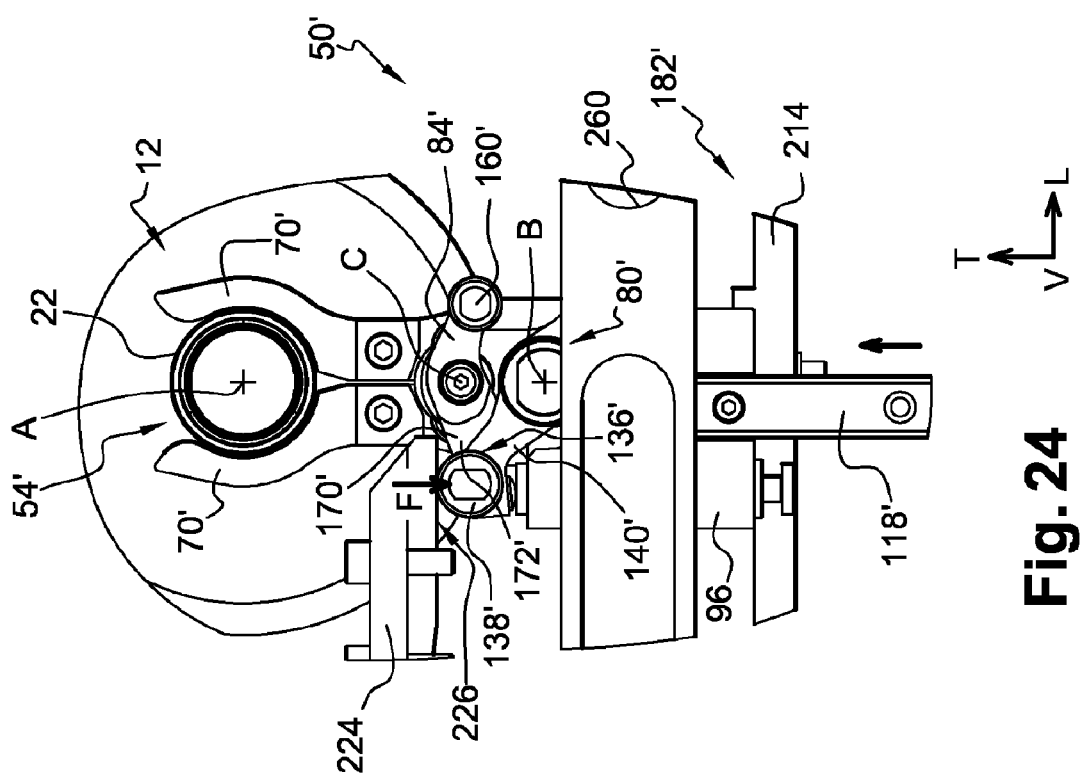

During the movement toward the forward grasping position, the jaws 70' of the grippers of the transfer device 50' will position themselves around the necks 22 of the containers 12, for example bottles in this instance, which have just been blow molded and the element 138' that instigates the closure of each module 182' will, at the same time as each gripper 54' engages around the neck 22, collaborate with the vertical instigating face 226 of the actuating member 224 of the second actuating means 94, as illustrated in detail in FIG. 24.

The actuating member 224 then applies to the instigating element 138' a rearwardly directed transverse force F which simultaneously causes the instigating element 138' to move back and the support arm 140', to which the instigating element 138' is secured and which also bears the locking pawl 130', to pivot counterclockwise about the axis B.

The process is similar to that described hereinabove in respect of the closure of the grippers 54 around the necks 22 of the preforms 14, the force F applied causes the unlocking of the locking means 92 by moving the locking pawl 130' out of the notch 136', that is to say toward the retracted position.

The unlocking performed releases the assembly formed by the separating member 82' and the driving link 84' which, urged by the elastic return means 60' (such as a spring) which return the levers 54'a, 54'b, then closes automatically around the necks 22 of the containers 12.

Of course, the operation of closing the grippers 54' of the transfer device 50' around the necks of the containers 12 is synchronized suitably with the vertical lifting of the blowing means (not depicted) and the opening of the mold 40.

As illustrated in FIG. 19, the four containers 12 are then loaded by their respective necks 22 into the grippers 54' and can be transferred downstream.

Of course, the transverse spacing between the front end of the two jaws 70, 70' of each gripper 54, 54' is advantageously greater than the diameter of the necks 22 of the preforms 14 or of the containers 12 so that the grippers 54, 54' in the open position can engage around the necks 22 transversely without contact and so that the necks 22 are positioned overall in the center of the opening 76, 76' when the closure of the jaws of each gripper 54, 54' is triggered.

In a third step of the cycle, the first transmission means 204 are made to move longitudinally in the direction L, on the one hand, the transfer device 50' of the molding unit 38 toward the unit 52 situated downstream and, on the other hand, the transfer device 50 toward the molding unit 38.

The movements of the two transfer devices 50, 50' are simultaneous and perfectly synchronized because of the fact that the longitudinal support bar 216 of the transfer device 50' is connected by its upstream free end 220 to the adjacent module 182 of the transfer device 50 and because of the fact that common drive means (belt, motor, neither depicted) are being used.

The transfer device 50 is moved longitudinally from the intermediate position it occupied in FIG. 19 into the position it occupies in FIG. 20, in which position the preforms 14 can be unloaded into the mold 40 so that they can be blow molded in order to obtain the containers 12.

During this longitudinal movement, the separation between the modules 182 of the transfer device 50 is modified to achieve the value of the second separation PAS2, by virtue of the connecting means 186 described hereinabove.

Specifically, the modules 182 of the transfer device 50 are automatically switched, during the transfer downstream, from their initial contracted configuration (FIG. 10), which corresponds to the first separation PAS1, to the final deployed configuration (FIG. 11) which corresponds to the second separation PAS2.

Likewise, the position occupied by the transfer device 50' in FIG. 20 at the unit 52 corresponds to the position in which the containers 12 are intended to be unloaded so that they can be filled and removed.

The fourth step in the cycle consists mainly in selectively instigating, on the one hand, the opening of the grippers 54 of the transfer device 50 in order to unload the preforms 12 and, on the other hand, the opening of the grippers 54' of the transfer device 50' in order to unload the containers 12.

In the molding unit 38, the two half-molds 46a, 46b of the mold 40 are moved translationally toward the closed position in which the body 16 of each preform 14 extends vertically inside a volume delimited by the meeting of the complementary half-cavities 48.

Advantageously, the operation of unloading the preforms 14 by opening the grippers 54 is performed when each preform 14 is immobilized by means such as the mold 40 and/or part of the associated blow-molding means (not depicted), so that as the grippers 54 open, the reference angular position of each preform 14 transferred cannot be altered.

In order to unload the preforms 14, the actuator 234 of the second actuating means 94 is operated in such a way as to cause the bar 225 bearing the members 224 to move downstream in a translational movement in the longitudinal direction L as was described earlier in respect of FIG. 15.

The members 224 of the second actuating means 94 move from the first actuating position in which each member 224 collaborates via its vertical instigating face 226 with the element 138' that instigates the closing of each gripper 54' of the second, container 12, transfer device 50' into the second actuating position in which each member 224 collaborates via its vertical instigating face 226 with the element 160 that instigates the opening of each gripper 54 of the first, preform 14, transfer device 50.

When the second actuating means 94 reach said second actuating position, the members 224 collaborate via their respective vertical instigating face 226 with the element 160 that instigates the opening of each gripper 54 of the first, preform 14, transfer device 50 as illustrated by FIG. 25.

Each member 224 therefore acts on the opening-instigating element 160 with an opening force O which causes the driving link 84 to pivot about the vertical axis C, rotating the separating member 82 and, as a result, the parting member 100, from the passive position into the active position which corresponds to the open position of the gripper 54.

During this pivoting, the lever 170 is driven with the assembly formed of the separating member 82 and the driving link 84 so that the locking pawl 130 of the locking means 92, initially in the retracted position, travels over the guiding surface 178 until it enters the notch 136 corresponding to the locked position in which the locking pawl 130 keeps the gripper 54 in the open position against the action of the elastic return means 60, such as a spring, that return the levers 54a, 54b.

The operation of unloading the containers 12 is obtained in a similar way by operating the actuator 254 of the third actuating means 238 depicted in FIG. 16 and described hereinabove.

The actuator 254 is operated in such a way as to cause the actuating rod 256 to move into its deployed position which causes the bar 244 and the actuating members 242 to move from the first position into the second position known as the actuating position, that is to say in a translational movement in the opposite direction to the longitudinal direction L.

As the bar 244 moves toward the second actuating position, the vertical actuating face 246 of each actuating member 242 collaborates with the element 160' that instigates the opening of the gripper 54' of each module 182' of the transfer device 50' on which each actuating member 242 exerts a force O able selectively to initiate the opening of the grippers 54' allowing the manufactured containers 12 to be unloaded as illustrated in FIG. 26.

Specifically, the force O applied to the opening instigating element 160' causes the clockwise pivoting, about the vertical axis C, of the driving link 84', of the separating member 82' and of the parting member 100' toward the active position, and of the lever 170' bearing the notch 136'.

At the same time as the assembly formed by the separating member 82' and the driving link 84' moves toward the active position, the locking pawl 130' travels over the guiding surface 178' of the lever 170' until it enters the notch 136' in the locked position, the assembly comprised of the driving link 82' and the separating member 84' then being immobilized in the active position, against the action of the elastic return means 60', which position corresponds to the open position of the gripper 54' of the transfer device 50'.

Thanks to the mechanism for instigating selective opening and closure of the jaws of the grippers 54, 54' around the necks 22 of the preforms 14 or of the containers 12, there is obtained an end container 12 the neck 22 of which is free of any marks and which has an impeccable esthetic appearance.

In a fifth step, on the one hand, the second transmission means 206 are operated in the case of the first, preform 14, transfer device 50 so that the grippers 54 of each module 182 are made to fall back transversely by moving the rails 118 from their forward position to their rear position and, on the other hand, the actuators 208*a*, 208*b* that make up the second transmission means 208 are operated in the case of the second, container 12, transfer device 50' so as to cause the grippers 54' of each module 182' to fall back transversely by moving the rails 118' from their forward position to their rear position.

In a sixth step depicted in FIG. 22, the first transmission means 204 are operated in such a way as to move the transfer devices 50 and 50' longitudinally in the direction opposite to the direction L, so as to return them to the initial position that each device 50, 50' occupied at the start of the cycle and which is depicted in FIG. 17.

During this return movement of the transfer device 50, the connecting means 186 associated with the modules 182 will bring about the reverse change in configuration as the intermediate portion 202B of the channel 202 is negotiated, the modules 182 then switching from the deployed configuration they were occupying into the contracted configuration corresponding to the first separation PAS1.

The transfer devices 50, 50' can then perform a further cycle identical to the one that has just been described.

Advantageously, the apparatus 10 comprises control means (not depicted) for operating or controlling notably the actuating means 90, 94, 238 and the movement transmission means 204, 206 and 204, 208, respectively, so as automatically and repeatedly to carry out the transfer cycle according to a control process that corresponds, in particular, to the steps that have just been described.

Of course, the preferred embodiment of the transfer device 50 which has just been described is non-limiting and many alternative forms may be envisioned without departing from the scope of the invention, particularly as far as the locking means 92 are concerned.

As an alternative, the locking means 92 are, for example, created using a locking pawl mounted with the ability for translational movement rather than rotational movement about the axis B.

Likewise, locking of a mechanical type through collaboration of shapes between a pawl and a complementary notch may be replaced by other equivalent means, such as two magnets, one fixed and the other able to move, which would be secured to the assembly formed of the separating member 82 and the driving link 84.

The present invention is intended to be implemented in a linear apparatus for the manufacture of containers from thermoplastic preforms, particularly but not exclusively, an apparatus comprising a thermal conditioning unit equipped with a preferential heating oven in which the transfer device notably can guarantee that each preform is kept in said determined reference position.

However, the transfer devices according to the invention are also able to solve the problem of marks, etc., left on the necks by the grippers of the prior art and thus guarantee a high level of quality in the manufacture of containers the esthetic appearance of which is therefore free of such defects.

This is why the preform and container transfer devices according to the invention can advantageously be implemented in a linear container manufacturing apparatus independently of whether or not the apparatus comprises a preform heat treating oven of the "preferential heating" type.

The invention claimed is:

1. A transfer device (50, 50') for transferring a preform (14) or a container (12), comprising at least one gripper (54, 54') which consists of two horizontal levers (54*a*, 54*b*, 54'*a*, 54'*b*) mounted articulated about a vertical axis (B) between a position in which the gripper (54, 54') is open and a position in which it is closed, and which comprises elastic return means (60, 60') which return the levers (54*a*, 54*b*, 54'*a*, 54'*b*) toward the closed position, characterized in that the transfer device (50, 50') comprises a mechanism (80, 80') for selectively instigating the opening and closing of the gripper (54, 54'), this mechanism (80, 80') comprising:
a separating member (82, 82') for separating the levers (54*a*, 54*b*, 54'*a*, 54'*b*) which is intended to be driven by a driving link (84, 84') which is pivot-mounted about a shaft (C, 56),
the driving link (84, 84') that drives the separating member (82, 82') comprising at least one free end (88, 88') which is able to collaborate with first actuating means (90) intended to cause the gripper (54, 54') to open against the action of first elastic return means (60, 60') that return the levers (54*a*, 54*b*, 54'*a*, 54'*b*), and
associated locking means (92) which are mounted able to move between a locked position in which the gripper (54, 54') is kept in the open position and a retracted position in which the gripper (54, 54') is free to close,
the locking means (92, 92') being able to collaborate with second actuating means (94) intended to cause the locking means (92) to move from the locked position into the retracted position so as automatically to trigger the closing of the gripper (54, 54').

2. The transfer device (50, 50') as claimed in claim 1, characterized in that the separating member (82, 82') rotates as one with the driving link (84, 84') so that the assembly formed by the separating member and the driving link is able to pivot about the vertical shaft (C, 56) between:
an active position corresponding to the locked position of the locking means (92, 92'), in which position the separating member (82, 82') is kept in order to urge the levers (54*a*, 54*b*, 54'*a*, 54'*b*), against the action of the first elastic return means (60, 60'), into the position in which the gripper is open, and
a passive position corresponding to the retracted position of the locking means (92, 92') and in which the released separating member (82, 82'), which is urged by the first elastic return means (60, 60'), collaborates with stop means (110, 110') which determine the closed position of the gripper (54, 54').

3. The transfer device (50, 50') as claimed in claim 1, characterized in that the locking means (92, 92') comprise a locking pawl (130, 130') which is mounted to move between the retracted position and the locked position in which the locking pawl (130, 130'), which is urged by second elastic return means (132, 132'), collaborates with a complementary notch (136, 136') to immobilize the assembly formed by the separating member (82, 82') and the driving link (84, 84') against the action of the first elastic return means (60, 60').

4. The transfer device (50, 50') as claimed in claim 3, characterized in that the locking means (92, 92') comprise an instigating element (138, 138') instigating closure of the gripper (54, 54') which, being able selectively to collaborate with the first actuating means (90), is able to bring about unlocking by moving the locking pawl (130, 130') against the action of the second elastic return means (132, 132'), from the locked position into the retracted position so that, by releasing the assembly formed by the separating member (82, 82') and the driving link (84, 84'), the first elastic return means (60, 60') that elastically return the levers (54*a*, 54*b*, 54'*a*, 54'*b*) cause the gripper to close automatically.

5. The transfer device (50, 50') as claimed in claim 4, characterized in that the closure instigating element (138, 138') and the locking pawl (130, 130') are mounted secured to the free end (146, 146') of a support arm (140, 140') which is pivot-mounted at its other end (142, 142') about a vertical axis, the support arm (140, 140') being urged by the second elastic return means (132, 132') of the locking means (92, 92').

6. The transfer device (50, 50') as claimed in claim 1, characterized in that the driving link (84, 84') of the separating member (82, 82') comprises at its free end (88, 88') an instigating element (160, 160') that instigates the opening of the gripper (54, 54') and which, being able selectively to collaborate with the second actuating means (94), is able to cause the separating member (82, 82') to move from the passive position toward the active position corresponding to the open position of the gripper (54, 54').

7. The transfer device (50, 50') as claimed in claim 3, characterized in that the mechanism (80, 80') comprises a lever (170, 170') comprising an end which is connected to the driving link (84, 84') and the free other end (172, 172') of which comprises the notch (136, 136') that complements the locking pawl (130, 130').

8. The transfer device (50, 50') as claimed in claim 7, characterized in that the lever (170, 170') comprises a guiding surface (178, 178') adjacent to the notch (136, 136') and against which the locking pawl (130, 130') bears in the retracted position, in that the locking pawl (130, 130') travels over the ramp-forming guiding surface (178, 178') when the lever (170, 170') is driven by the driving link (84, 84') that the first actuating means (90) collaborating with the instigating element (160, 160') that instigates opening of the gripper (54, 54') moves toward the active position, and in that, when the driving link (84, 84') reaches the active position corresponding to the open position of the gripper, the locking pawl (130, 130') simultaneously pivots into the locked position entering the notch (136, 136').

9. A linear apparatus (10) for the manufacture of containers (12) from thermoplastic preforms (14), comprising, in succession, from upstream to downstream in a longitudinal direction (L) of travel, at least:
   a thermal conditioning unit (34) comprising heating means, such as a preferential-heating oven (36), intended to heat the preforms (14) to a determined temperature,
   a molding unit (38) comprising at least one mold (40) for converting at least one preform (14) into a container (12) by blow molding or by stretch-blow molding, and at least
   one transfer device (50, 50') as claimed in claim 1, which is intended to transfer a preform (14), or a group of preforms, from the thermal conditioning unit (34) to the molding unit (38).

10. The apparatus (10) as claimed in claim 9, characterized in that the apparatus (10) comprises a first transfer device (50) comprising at least one module (182) able to transfer simultaneously at least one preform (14) from a loading zone (184) situated at the exit from the thermal conditioning unit (34) as far as the molding unit (38).

11. The apparatus (10) as claimed in claim 10, characterized in that at least the modules (182) of the first preform (14) transfer device (50) are connected to one another via connecting means (186) able to vary the longitudinal separation that separates two successive grippers (54), between a first separation, known as (PAS1), corresponding to a contracted configuration of the modules (182) and a second separation, known as (PAS2), corresponding to a deployed configuration of the modules (182).

12. The apparatus (10) as claimed in claim 10, characterized in that each module (182) of the first preform (14) transfer device (50) comprises a gripper (54) the opening and closing of which is instigated selectively by means of the mechanism (80) so as notably to transfer the preform (14) while keeping it in a determined angular position from its loading to its unloading from the mold (40) of the molding unit (38).

13. The apparatus (10) as claimed in claim 12, characterized in that the first actuating means (90) are arranged at the loading zone (184) at the exit from the thermal conditioning unit (34) so as to collaborate with the instigating element (138) that instigates the closing of each gripper (54) in order selectively to instigate the closing of each gripper around the neck (22) of each preform (14) that is to be transferred.

14. The apparatus (10) as claimed in claim 9, characterized in that the second actuating means (94) are arranged at the molding unit (38) so as to collaborate with the instigating element (160) that instigates the opening of each gripper (54) in order selectively to instigate the opening of each gripper (54) when the preforms (14) are immobilized in the angular position that has been determined at least by the mold (40).

15. The apparatus (10) as claimed in claim 10, characterized in that the apparatus (10) comprises, downstream of the first (50), a second transfer device (50') comprising a similar mechanism (80') which is able to transfer in the downstream direction at least one container (12) manufactured by the molding unit via at least one module (182').

16. The apparatus (10) as claimed in claim 15, characterized in that the second actuating means (94) arranged at the molding unit (38) are able to collaborate with the instigating element (138') that instigates the closing of each gripper (54') of the second transfer device (50') so as selectively to instigate the closing of each gripper (54') around the neck (22) of the manufactured container (12) intended to be transferred in the downstream direction.

17. The apparatus (10) as claimed in claim 16, characterized in that the second actuating means (94) are mounted such that they can move between a first actuating position and a second actuating position so as selectively to collaborate with the instigating element (138') that instigates the closing of each gripper (54') of the second, container (12), transfer device (50') in the first position, and with the instigating element (160) that instigates the opening of each gripper (54) of the first, preform (14), transfer device (50) in the second position.

18. The apparatus (10) as claimed in claim 10, characterized in that the apparatus (10) comprises at least first transmission means (204) able to move the first, preform (14), transfer device (50) and/or the second, container (12), transfer device (50') in the longitudinal direction (L), and second transmission means (206; 208) able to move the grippers (54, 54') of the modules (182) of the first, preform (14), transfer device (50) and/or of the second, container (12), transfer device (50') in a transverse direction, orthogonal to the longitudinal direction (L) of travel, so that the preforms (14) or the containers (12) can be loaded or unloaded, respectively.

19. The apparatus (10) as claimed in claim 9, characterized in that the apparatus comprises third actuating means (238) which, arranged downstream of the molding unit (38), are able to collaborate with the instigating element (160') that instigates the opening of each gripper (54') in order selectively to instigate the opening of each gripper (54') of the second transfer device (50') so as to release the containers (12).

20. The transfer device (50, 50') as claimed in claim 2, characterized in that the locking means (92, 92') comprise a locking pawl (130, 130') which is mounted to move between the retracted position and the locked position in which the locking pawl (130, 130'), which is urged by second elastic return means (132, 132'), collaborates with a complementary notch (136, 136') to immobilize the assembly formed by the separating member (82, 82') and the driving link (84, 84') against the action of the first elastic return means (60, 60').

* * * * *